US012754041B2

(12) United States Patent
Dmitriev et al.

(10) Patent No.: US 12,754,041 B2
(45) Date of Patent: Oct. 6, 2026

(54) METHOD, APPARATUS, AND SYSTEM OF PROVIDING LARGE LANGUAGE MODEL MAP FEEDBACK REPORTING

(71) Applicant: HERE Global B.V., Eindhoven (NL)

(72) Inventors: Andrei Dmitriev, Berlin (DE); Onur Derin, Eindhoven (NL); Jérôme Beaurepaire, Courbevoie (FR); Oleksandr Kondrashov, Berlin (DE); Rafiullah Mohammed, Whiting, IN (US)

(73) Assignee: HERE GLOBAL B.V, Eindhoven (NL)

( * ) Notice: Subject to any disclaimer, the term of this patent is extended or adjusted under 35 U.S.C. 154(b) by 101 days.

(21) Appl. No.: 18/642,394

(22) Filed: Apr. 22, 2024

(65) Prior Publication Data

US 2025/0327687 A1 Oct. 23, 2025

(51) Int. Cl.
*G01C 21/00* (2006.01)
*G06F 40/20* (2020.01)

(52) U.S. Cl.
CPC ..... *G01C 21/3856* (2020.08); *G01C 21/3848* (2020.08); *G06F 40/20* (2020.01)

(58) Field of Classification Search
CPC .. G01C 21/3856; G01C 21/3848; G06F 40/20
See application file for complete search history.

(56) References Cited

U.S. PATENT DOCUMENTS 9,152,295 B2 10/2015 Lai et al.
10,788,332 B2 9/2020 Deluca et al.
2013/0326380 A1* 12/2013 Lai .................... G06F 3/04815 715/765
2015/0253147 A1* 9/2015 Gruijters ........... G01C 21/3856 701/418
2016/0007209 A1* 1/2016 Hohs ................. G01C 21/3841 455/423

OTHER PUBLICATIONS

Office Action for related European Application No. 25170187.6-1009, dated Oct. 15, 2025, 6 pages.

(Continued)

*Primary Examiner* — Vivek D Koppikar
*Assistant Examiner* — Jeffrey R Chalhoub
(74) *Attorney, Agent, or Firm* — DITTHAVONG, STEINER, & MLOTKOWSKI

(57) ABSTRACT

An approach is provided for large language model (LLM) map feedback reporting. The approach involves, for example, processing an input specifying a map error/feedback using an LLM to classify a map error type. The approach also comprises determining a map error template based on the map error type that specifies structured data fields for the map error type. The approach further involves using the template to construct prompts for the LLM to generate questions to collect data items for populating the data fields, and providing the prompts to the LLM to generate the questions and collect the data items from the user. The approach further involves using template to generate additional prompts to generate a map error report of the data items in a structured data format, and providing the additional prompts to the LLM to generate the map error report for transmission to a map feedback system.

20 Claims, 11 Drawing Sheets

(56) References Cited

OTHER PUBLICATIONS

Cui et al., "Receive, reason, and react: Drive as you say with large language models in autonomous vehicles", Journal of Latex Class Files, vol. 14, No. 8, Aug. 2015, 11 pages.
Kothlow, "Driving into the future: Exploring the integration of ChatGPT and ai in vehicle development", retrieved from https://blogs.sw.siemens.com/simcenter/driving-into-the-future-exploring-the-integration-of-chatgpt-and-ai-in-vehicle-development/, Nov. 30, 2023, 4 pages.
Xu et al., "Drivegpt4: Interpretable end-to-end autonomous driving via large language model", Feb. 13, 2024, 16 pages.
Chen et al., "Feedback is all you need: From ChatGPT to autonomous driving", Jun. 2023, vol. 66, 3 pages.

* cited by examiner

METHOD, APPARATUS, AND SYSTEM OF PROVIDING LARGE LANGUAGE MODEL MAP FEEDBACK REPORTING

BACKGROUND

Providing accurate map and traffic data is a key function for mapping service providers. One approach to map making relies on map feedback (e.g., map error reports, updates, etc.) from users as they travel (i.e., crowdsourcing the detection of map errors). At the same time, the development of large language models (LLMs) has enabled users to interact with computer systems using natural language. As a result, mapping service providers face significant technical challenges with respect to applying developments in foundational LLMs to the domain of map feedback without having to specifically train the LLMs.

SOME EXAMPLE EMBODIMENTS

Therefore, there is a need for an approach for providing large language model (LLM) map feedback reporting.

According to one embodiment, a method comprises receiving an input from a user, the input specifying a map error. The method may be a computer-implemented method. The method also comprises processing the input using a large language model (LLM) to classify a map error type of the map error. The method further comprises determining a map error template based on the map error type. For example, the map error template specifies, at least in part, one or more data fields for reporting the map error using a structured data format for the map error type. The method further comprises using the map error template to construct one or more prompts for the LLM to generate one or more questions to collect one or more data items for populating the one or more data fields from a user. The method further comprises providing the one or more prompts to the LLM to cause the LLM to initiate a collection of the one or more data items from the user using the one or more questions. The method further comprises using the map error template to construct one or more additional prompts for the LLM to generate a map error report comprising the one or more data items in the structured data format. The method further comprises providing the one or more additional prompts to the LLM to cause the LLM to initiate a generation of the map error report, and transmitting the map error report to a map feedback system.

Embodiments described herein include a computer program product having computer-executable program code portions stored therein, the computer-executable program code portions including program code instructions configured to perform any method disclosed herein.

According to another embodiment, an apparatus comprises at least one processor, and at least one memory including computer program code for one or more computer programs, the at least one memory and the computer program code configured to, with the at least one processor, cause, at least in part, the apparatus to receive an input from a user, the input specifying a map error. The method also comprises processing the input using a large language model (LLM) to classify a map error type of the map error. The apparatus is further caused to determine a map error template based on the map error type. For example, the map error template specifies, at least in part, one or more data fields for reporting the map error using a structured data format for the map error type. The apparatus is further caused to use the map error template to construct one or more prompts for the LLM to generate one or more questions to collect one or more data items for populating the one or more data fields from a user. The apparatus is further caused to provide the one or more prompts to the LLM to cause the LLM to initiate a collection of the one or more data items from the user using the one or more questions. The apparatus is further caused to use the map error template to construct one or more additional prompts for the LLM to generate a map error report comprising the one or more data items in the structured data format. The apparatus is further caused to provide the one or more additional prompts to the LLM to cause the LLM to initiate a generation of the map error report, and transmitting the map error report to a map feedback system.

According to another embodiment, a non-transitory computer-readable storage medium carries one or more sequences of one or more instructions which, when executed by one or more processors, cause, at least in part, an apparatus to receive an input from a user, the input specifying a map error. The method also comprises processing the input using a large language model (LLM) to classify a map error type of the map error. The apparatus is further caused to determine a map error template based on the map error type. For example, the map error template specifies, at least in part, one or more data fields for reporting the map error using a structured data format for the map error type. The apparatus is further caused to use the map error template to construct one or more prompts for the LLM to generate one or more questions to collect one or more data items for populating the one or more data fields from a user. The apparatus is further caused to provide the one or more prompts to the LLM to cause the LLM to initiate a collection of the one or more data items from the user using the one or more questions. The apparatus is further caused to use the map error template to construct one or more additional prompts for the LLM to generate a map error report comprising the one or more data items in the structured data format. The apparatus is further caused to provide the one or more additional prompts to the LLM to cause the LLM to initiate a generation of the map error report, and transmitting the map error report to a map feedback system.

According to another embodiment, an apparatus comprises means for receiving an input from a user, the input specifying a map error. The apparatus also comprises means for processing the input using a large language model (LLM) to classify a map error type of the map error. The apparatus further comprises means for determining a map error template based on the map error type. For example, the map error template specifies, at least in part, one or more data fields for reporting the map error using a structured data format for the map error type. The apparatus further comprises means for using the map error template to construct one or more prompts for the LLM to generate one or more questions to collect one or more data items for populating the one or more data fields from a user. The apparatus further comprises means for providing the one or more prompts to the LLM to cause the LLM to initiate a collection of the one or more data items from the user using the one or more questions. The apparatus further comprises means for using the map error template to construct one or more additional prompts for the LLM to generate a map error report comprising the one or more data items in the structured data format. The apparatus further comprises means for providing the one or more additional prompts to the LLM to cause the LLM to initiate a generation of the map error report, and means for transmitting the map error report to a map feedback system.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing large language model (LLM) map feedback reporting are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
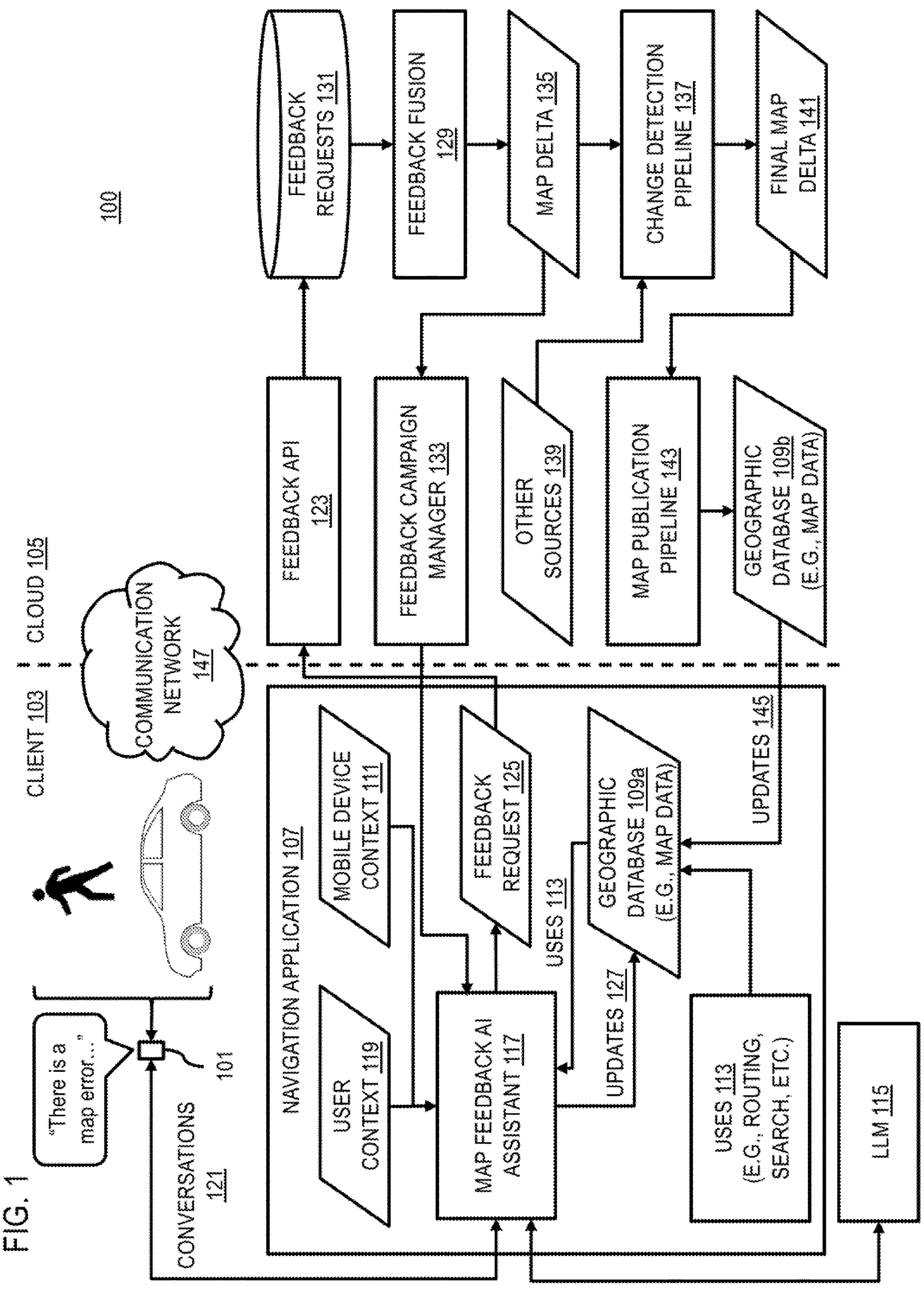
FIG. 1 is a diagram of a system capable of providing large language model (LLM) map feedback reporting, according to one example embodiment.

FIG. 1 is a diagram of a system capable of providing LLM map feedback reporting, according to one example embodiment. One of the challenges faced by map service providers is to ensure the accuracy and timeliness of their map data, which may be affected by various factors such as changes in road geometry, road signs, road closures, construction work, traffic accidents, temporary conditions (e.g., potholes, objects in the roadway, etc.), and/or the like. To address this issue, some map service providers rely on crowdsourced feedback from end users who report any errors or discrepancies they encounter while using the map data for navigation and routing purposes. As used herein, there terms “map feedback” and “map error reporting” are used interchangeably with “map feedback” encompassing both map error and non-error report feedback on the map data. However, collecting and processing such feedback can be difficult and costly, especially if the feedback is provided in a textual or graphical form that requires manual input or verification. Moreover, providing such feedback can be distracting and unsafe for the drivers, who may have to divert their attention from the road or stop their vehicle to enter the feedback information.

Therefore, there is a need for an improved method, apparatus, and computer program for providing LLM map feedback reporting, which can enable a natural and seamless interaction between the map service provider and the end users, and reduce the cognitive load on the drivers who provide the feedback. In particular, there is a need for a system that can automatically process and interpret the feedback provided by the drivers in a vocal and plain language form, and generate map updates based on the feedback. Such a system can leverage the advances in LLMs, which are capable of learning complex patterns and representations from large amounts of text data, and performing various natural language processing tasks, such as natural language understanding, natural language generation, or natural language translation.

By using LLMs, the system can convert the vocal and plain language feedback into structured and actionable map update requests, and validate the requests with other sources of map data or feedback. The system can also provide feedback to the drivers about the status and outcome of their map update requests, and solicit further information or clarification if needed. An LLM can be a valuable tool in providing map feedback or error reporting. Because LLMs are trained on massive amounts of text, they have a nuanced understanding of language and can recognize patterns in location descriptions. This allows users to provide feedback in a natural, conversational way (e.g., "The coffee shop is marked in the wrong spot, it's actually two blocks further east"). The LLM can then process this information, potentially understanding the error, asking clarifying questions, and helping to update mapping data for improved accuracy. In addition, by providing feedback shortly after the error in the map has been recognized, a fresher, more accurate recollection of details pertaining to the error may be achieved by the user, than if, e.g., providing the feedback after arriving at a destination.

These capabilities rely on the ability of LLMs to understand natural language and turn them into actionable input with a structure. Structured data provides a way to organize map feedback and error reports using a format that computers can easily understand. It uses things like geocoding (latitude and longitude coordinates) and schemas (standardized formats) to clearly define locations and their details (like business names and addresses). Additionally, structured data can include specific properties to flag errors such as incorrect addresses, closed businesses, or places with the wrong category label. This structured approach makes the feedback much easier for map systems to process. One, but not exclusive, example of structured data for map data reporting is based on JSON or GeoJSON or equivalent as illustrated in the Table 1 below:

TABLE 1

```
{
  "type": "Feature",
  "geometry": {
    "type": "Point",
    "coordinates": [−118.2436849, 34.0522342]
  },
  "properties": {
    "name": "Pizza Place",
    "feedback": {
      "errorType": "IncorrectLocation",
      "suggestedCoordinates": [−118.240000, 34.050000]
    }
  }
}
```

However, LLMs are still faced with challenges that prevent them from being used out of the box for this problem. Foundational LLMs are trained with public data that are snapshot at a fixed date. Due to the big amount of compute, power, and time needed to train LLMs, they are not trained very frequently and thus their knowledge of the world is not up-to-date even when they are released publicly. Therefore, making use of LLMs in combination with private data (in this case, proprietary map data) is a significant technical challenge.

Map data represent as best as possible the state of the physical world. They are required to be accurate, fresh, comprehensive and have global coverage. HERE has a state-of-the-art map model and updates its map at a high frequency by processing raw input (e.g., vehicle sensor data). Considering the number of attributes across several map layers, it is not always possible to rely solely on sensor data to create and maintain the whole map. One of the input types for sourcing the map data is natural language, which has been traditionally processed with natural language processing (NLP) techniques (e.g., detecting opening hours of a POI from its website or from unstructured voice input).

For example, a map service provider may collect map feedback (e.g., map error reports) from its users in several forms such as but not limited to: (a) as map edits done via an application or web tool); and (b) as form submissions via a navigation client application. Turning such feedback into actual map edits is not always an automated process, especially when it involves incomplete and/or unstructured data such as natural language text.

To address these technical challenges, the system 100 of FIG. 1 introduces a capability to provide usable map updates based on LLM-processed map feedback or error reporting from a running navigation application by performing crowd-sourcing of map feedback and map update validation. In one example scenario, when a driver sees or detects a discrepancy or inconsistency between the map in the navigation system and reality, the driver describes the problem in plain words (e.g., vocally or textually). This output is then structured in order to be processed by the system. Based on the type of update requested (map attributes, dynamic service update like traffic or parking situation, etc.), the system adapts the format so that it can be ingested by the intended service.

In one embodiment, the system applies knowledge about the current mobile device location, direction of movement and planned route, together with map-aware trained speech recognition model (e.g., an LLM), to build a comprehensive machine-readable representation of the provided feedback. For example, the system can leverage mobile device components and/or sensors to obtain this knowledge. Such components and/or sensors include but are not limited to:

(1) Mobile device (e.g., vehicle or component thereof, infotainment unit, smartphone, wearable, etc.) sensors (a) Global Navigation Satellite System (GNSS): Real-time GNSS data provides the car's precise location (latitude and longitude), enabling the system to pinpoint the exact map location associated with the user's feedback. (b) Speedometer and Odometer: These sensors, along with GNSS data, track the car's speed and distance traveled. By analyzing changes in position over time, the system can infer the position along a road or route.

(c) Inertial Measurement Unit (IMU): IMUs are sensor electronics that measure and report at least one of a body's specific force, angular rate, or orientation, using a combination of accelerometers, gyroscopes, or magnetometers. By analyzing changes over these metrics, the system can infer a direction of movement (north, south, east, or west), a heading (e.g. in deg), acceleration rate, braking rate, etc. possibly yielding an expected position along a road or route.

(d) Camera(s): Cameras and equivalent imaging sensors can be used to understand the mobile device's surroundings with advances in computer vision algorithms for object detection, classification, structure from motion, three-dimensional (3D) scene understanding, etc. For example, in the case of a vehicle or other mobile device, they help to derive a more accurate position on the road (laterally and longitudinally) and enrich the location context by detecting road signs, buildings, store fronts, etc. that can be used for visual positioning. This location context can then be compared to a database of geographic features (e.g., the geographic databases 109*a* or 109*b*) to determine a mobile device's position.

(2) Navigation Application:

(a) Route Planning: The navigation application utilizes map data to create the user's planned route, including the intended roads for reaching the destination.

By integrating information from these sources, the system gains valuable context for the user's feedback:

Geolocation: The GNSS data ensures the feedback is linked to the user's precise location on the map.

Verification: The system can verify if the reported issue (e.g., road closure) aligns with the user's planned route as defined by the navigation application. This verification process helps assess the credibility of the feedback.

For instance, if a user reports a missing traffic light, the system can use GNSS data to pinpoint the location and verify if it falls on the route planned by the navigation app. This contextual understanding offers several advantages:

Enhanced Feedback Accuracy: The system can generate more accurate reports by incorporating not only the reported issue (missing traffic light) but also the verified location based on GNSS and route data.

Improved Filtering: Feedback that seems irrelevant to the user's current trip can be filtered out. If a user reports a closed road but their navigation app does not include that road, it might indicate a mistake or irrelevant feedback for their current journey.

In one embodiment, the navigation system applies needed correction immediately to the map in use and corrects the planned route accordingly. In addition or alternatively, the map feedback or error report is sent to the map service provider for map correction, so that other users can benefit from it. Applying the feedback to the driver's navigation system, for instance, can act as a filter against erroneous or vandalizing feedback, thus simplifying the correction moderation for the vendor.

In summary, the system 100 introduces novel capabilities in an end-to-end map feedback flow where natural language interactions with app users (e.g., drivers, riders, or pedestrians) are input to the feedback processing system (e.g., based on an LLM) that turns them into incremental updates to the map data. The system 100 firstly collects map feedback in the form of a dialogue via (e.g., a feedback agent using an LLM) so that the feedback is made sure to be complete by the LLM asking follow-up questions to the users for clarification and allowing them to ask for help on how they could provide input for certain feedback attributes. The number of feedback types and the number and type of attributes per feedback request type makes this a difficult problem.

Secondly, there is usually a disconnect between users' view/knowledge of the world (in terms of terminology and context) and the concrete domain specific structured data that goes into a map feedback request such as the categorization and identification of map objects. This presents a challenge to contextualize the human language and translate from the unstructured human domain to structured mapping domain. To exemplify simply, consider the human feedback "The road on the right is a one-way street and not a two-way as shown on the map". The system would need to identify "the road on the right" based on user's location and direction of travel. The system would also need to identify a mapping of one-way and two-way to the internal categorization of road types used in the map database.

As shown in FIG. 1, in one embodiment, the system 100 comprises an automated map feedback collection and processing pipeline with a user (e.g., a driver of a vehicle or other user type associated with a mobile device 101 such as but not limited to a rider of the vehicle, a passenger, a pedestrian, etc.) as the feedback source (e.g., map error reporting source). The system 100, for instance, is divided into mainly two parts: (1) the client 103 (e.g., comprising the mobile device 101, which may be a vehicle, or smartphone, wearable, infotainment unit or the like aboard the vehicle, and a user associated to it, for example a driver, passenger of the vehicle or other user co-located with the user device) and the cloud 105 forming the backend services running, for instance, on an infrastructure elsewhere (e.g., the cloud 105). Although the various embodiments described herein separate the system 100 into a client 103 side and cloud 105 side, it is contemplated that the various functions attributed to either side said can be performed by the other side alone or in combination, or can be performed by another component of the system 100.

In one embodiment, a navigation application 107 or software is a sub-system in the software stack of the client 103 (e.g., the software stack of the mobile device 101) that stores, for instance, map data (e.g., map data of a geographic database 109*a* stored or otherwise accessible via the mobile device), and positions the mobile device on the map by using mobile device sensor data (e.g., GNSS, inertial sensors and cameras) and/or otherwise determines mobile device context 111. The mobile device context 111, for instance, refers to contextual information about the mobile device 101 including but not limited to its location (e.g., location coordinates, proximity to known map features, etc.), operating environment (e.g., road type, speed limits, traffic, weather conditions, etc.). In instances where the mobile device 101 is associated with a vehicle, the mobile device context 111 can further include vehicle-specific context such as but not limited to vehicle type, information on on-board sensors, vehicle capabilities, etc. The navigation application 107 can then render the location and/or mobile device context 111 in the map on a display and provides user-facing services such as route calculation and POI search (e.g., uses 113) via a graphical user interface and/or any other type of user interface (e.g., augmented reality, virtual reality, audio, voice, etc.). For example, vehicles or mobile devices 101 have been equipped with voice interfaces with varying degrees of quality.

But it is only recently with the advancements in LLMs (e.g., LLM 115) that conversations with these voice-enabled artificial intelligence (AI) assistants started yielding better user experience. It is contemplated that any LLM can be used according to the various embodiments described herein including but not limited to Gemma, Gemini, Llama 2, Mistral, ChatGPT, QwenLM/Qwen, LLaVa, or equivalent.

An AI assistant integrated within the navigation application 107 can leverage natural language processing to interpret a user's conversational queries, understanding not just simple commands but the intent behind those commands. This allows for a more intuitive interaction, where the user can ask for directions, points of interest, or modifications to a planned route in their everyday speech, without the restrictions of pre-scripted phrases common in previous implementations. The AI assistant draws upon contextual information like the user's location, past navigation preferences, and real-time traffic data, delivering highly relevant and personalized results. Additionally, these AI assistants can proactively suggest optimized routes based on traffic patterns or even alert users to points of interest aligned with their preferences. This enhanced interaction and proactive assistance extends beyond the core function of turn-by-turn navigation, transforming the navigation application 107 into a comprehensive and intelligent travel companion.

In one embodiment, a Map Feedback AI Assistant 117 is an additional component of the navigation application 107 that supplements the application's core AI assistant. It is an AI assistant empowered to transform interactions (e.g., natural language interactions) with the driver or other user into structured map feedback requests by incorporating the user's context (e.g., user context 119) and mobile device's context (e.g., mobile device context 111). By way of example, the user context 119 includes attributes and characteristics of the user of the mobile device 101 (e.g., a driver when the mobile device 101 is associated with a vehicle) including but not limited to past navigation history, saved preferences, identifiable driving/movement patterns/behaviors, and/or the like. As previously noted, the mobile device context 111 include attributes and characteristics of the mobile device 101 including but not limited to the mobile device's make and model, onboard sensors (e.g., GNSS, camera, lidar, etc.), availability connectivity for data exchange, real-time location, planned route, direction of travel, travel conditions along the route, relevant points of interest, road conditions, etc.

In one embodiment, the map feedback AI assistant 117 interacts with the user (e.g., user of the mobile device 101) through natural language conversations 121 (e.g., the user initiates the conversation by providing feedback such as "There is a map error . . . " or other natural language input). Based on the type of error that is being reported, the map feedback AI assistant 117 can engineer prompts to gather more information on the feedback using a conversational approach. For example, the map feedback AI assistant 117 can determine the structured data needed by a feedback application programming interface (API) (e.g., data fields, data formats, etc.) to generate a feedback request 125 from the conversations 101. The map feedback AI assistant 117 then prompts the LLM 115 to generate questions to request additional map feedback data from the user as needed. If not already provided by the user or known from the user context 119 and/or mobile device context 111, these questions can be used to request information on topics such as but not limited to: (1) error type—"What kind of error did you find? Is it a wrong address, closed road, missing place, or something else?"; (2) location—"Can you describe the location? You could say the street names, landmarks nearby, or even 'right here' if it's affecting your current route."; and (3) other details (e.g., depending on feedback/error type)—"Are there any other details you'd like to add?" The map feedback AI assistant 117 might offer suggestions: "New speed limit? Road construction? One-way street marked wrong?"

In one embodiment, the navigation application 107 can generate updates 127 using the map feedback from the driver and apply the updates 127 directly to the in-mobile device map (e.g., geographic database 109*a*) in a personalization layer and could be used as the primary truth, for example, when a route is calculated offline or when performing other specified uses 113 of the map data (e.g., searching, displaying, etc.).

In one embodiment, before the feedback request 125 is applied to edit the map in the cloud (e.g., map data of the geographic database 109*b*—the geographic database 109*a* and 109*b* are also collectively referred to as geographic databases 109*a* or 109*b*), the feedback can be confirmed to meet a designated degree of confidence. This is done by the Feedback Fusion 129 stage where individual feedback requests 125 are aggregated (e.g., in feedback requests database 131), conflated (e.g., by merging multiple feedback requests 125 about the same error or map feature), and scored (e.g., based on confidence of the submitted feedback or map error). If the confidence score is not enough, connected mobile devices 101 that are in the area associated with the feedback request 125 under review can receive the campaign to confirm this change from the feedback campaign manager 133. More specifically, the feedback campaign manager 133 pushes a campaign delineating the specific information about the feedback request 125 that needs further confirmation to the map feedback AI assistant 117. The map feedback AI assistant 117 is then prompted to initiate a conversation where it asks the driver questions on the data fields of the feedback request 125 that require confirmation. Therefore, campaigns enable collection of more feedback and creation of map deltas 135. As used herein, the term "map delta" refers to the specific changes or differences (e.g., map additions, deletions, and/or modifications) of one or more mapped features stored in the map data needed to update one version of a map to a newer version.

By way of example, the confidence of a feedback request 125 can be scored by the LLM 115 analyzing the user's feedback to decipher the type of map error type (e.g., incorrect address, closed business, missing location, etc.). The clarity of this categorization and the specificity of the location description can be used to influence the initial confidence score. To further refine the confidence score, the LLM 115 cross-references the reported feedback with the user context 119 and/or mobile device context 111. The driver's route, location history, and preferences provide relevant data points. Additionally, the mobile device's location coordinates and sensor data (e.g., recorded speed, imagery, estimated sensor field of view, etc.) can corroborate specific feedback elements. When the feedback aligns with these contextual factors, the confidence score increases. Finally, the LLM 115 can proactively prompt the user for additional information to enhance the quality of the feedback. It might seek confirmation about the error, request greater location specificity, or inquire about supportive visual cues. The LLM 115 then assigns a final confidence score based on the clarity of the feedback, its alignment with available contextual data, and the quality of information gathered via targeted questions. It is noted that the execution of the campaign loop can introduce a delay in detecting map changes in favor of higher confidence. For static attribute changes, confidence is more important than the incurred delay. For dynamic attribute changes, a confident but late change is of lesser value. Thus, confidence thresholds can be specified according to the type of map change (e.g., static versus dynamic).

Further downstream in the processing pipeline, the map deltas 135 from the map feedback service are fed to the Change Detection Pipeline 137 which is fed by even more sources (e.g., other sources 139 such as but not limited to vehicle probe data, manual map edits, etc.). The final map edits (e.g., final map delta 141) are applied to the main map (e.g., cloud copy of the geographic database 109*b*) and gets published to be consumed by mobile devices (e.g., mobile device 101) and location services by the map publication pipeline 143. This step finally closes the feedback processing loop by providing the final updates 145 to the local copy of the geographic database 109*a* of the navigation application 107.

Figure 2:
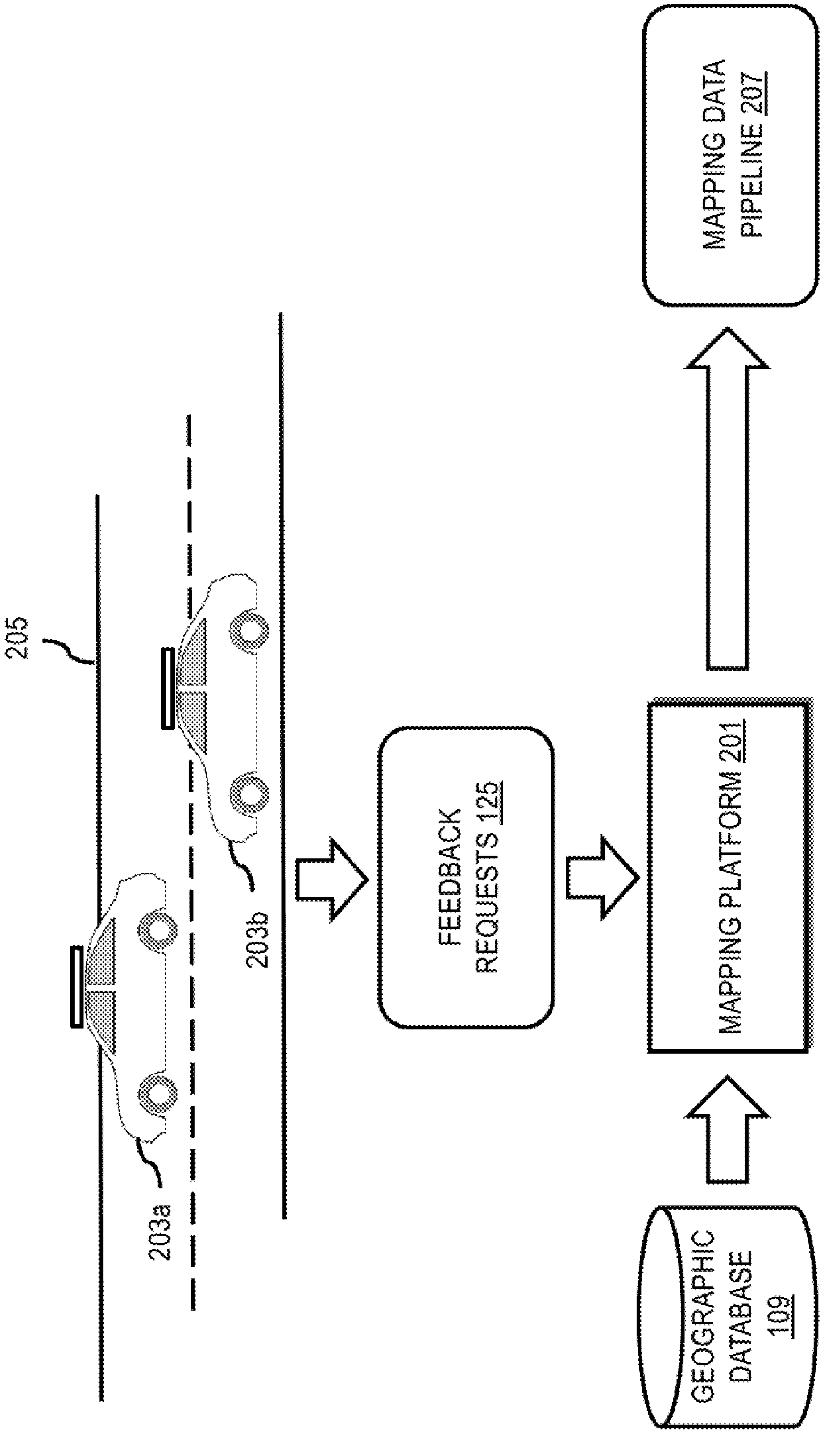
FIG. 2 is a diagram illustrating a mapping data pipeline including LLM-based map feedback reporting, according to one embodiment.

FIG. 2 is a diagram illustrating a mapping data pipeline including LLM-based map feedback reporting, according to one embodiment. As described above, the process for LLM-based map feedback reporting can be performed as part of an automated and/or manual mapping pipeline as shown in FIG. 2. Automated refers, for instance, to operating the pipeline without manual intervention in all or a portion of the pipeline from data ingestion to output of the map data. As shown, a mapping platform 201 receives map feedback requests 125 (e.g., map error reports) as the vehicles 203*a*/203*b* (e.g., instances of mobile devices 101) travel on a road 205 to detect map errors 207 or other map discrepancies. Each map feedback request 125 can be supplemented with driver and mobile device context data (e.g., location, heading, speed, etc. of the mobile device along with a time stamp). In some embodiment, the feedback request 125 can include sensor data (e.g., image data, lidar scans, etc.) to supplement the natural language reports used to generate the feedback requests 125.

The mapping platform 201 aggregates, conflates, and analyzes the feedback requests 125 (e.g., from multiple vehicles 203*a*/203*b* and/or users) to determine map error reports or other map feedback, according to the various embodiments described herein. In one embodiment, the mapping platform 201 represents the cloud 105 components described with respect to FIG. 1, and processes the map feedback requests 125 using a mapping data pipeline 207. The mapping data pipeline 207, for instance, can process the map feedback requests 125 to generate digital map data or real-time data updates for the geographic database 109 and/or to provide location-based services (e.g., to a mobile device 101 or other client devices executing the navigation application 103). The mapping data pipeline 207, for instance, can further process, verify, format, etc. the map feedback data and/or any other data derived therefrom before publication, use, or updating of the digital map data and/or dynamic content of the geographic databases 109*a* or 109*b*.

In one embodiment, the mapping platform 201 can use any architecture for transmitting the map data or updates generated based on map feedback requests 125, and/or related information to the end user devices (e.g., the mobile device 101 and/or other devices executing the navigation application 121 or providing location-based services using such data) over a communication network 147.

Also, the mapping platform 201 is capable of detecting map errors and generating map updates to support the services to be used for highly automated driving on L3, L4, and even further for L5 level autonomous driving for multiple purposes like road safety enhancement and routing navigation improvement. For example, the Society of Automotive Engineers (SAE) has established a classification system to categorize the different levels of automation in vehicles. This classification, known as the SAE J3016 standard, defines six levels, ranging from Level 0 (No Automation) to Level 5 (Full Automation). For example, a driver or passenger of an (semi-) autonomous vehicle may interact with the Map Feedback assistant AI 117 to report a map error which may be causing an incorrect operation of the (semi-) autonomous vehicle. An example of such a scenario could be that a vehicle is exceeding the speed limit, while the driver or passenger realizes that the posted speed limit is lower than the vehicle's current speed. Whether the speed mismatch is due to a map error or some other malfunction (e.g. incorrect sign detection) may be determined by comparing the map data made available to the (semi-) autonomous vehicle vs. the collected map feedback. Similar scenarios may be envisioned where the user realizes a mismatch between the road features and the vehicle behavior.

Each level represents a different degree of automation, indicating the extent to which a vehicle can perform driving tasks without human intervention. At Level 0 (No Automation), there is no automation, and the human driver is responsible for all aspects of driving. The vehicle may have some basic driver assistance features, but they do not constitute automation. Level 1 (Driver Assistance) involves driver assistance systems that can handle either steering or acceleration/deceleration tasks. However, the human driver must remain engaged and monitor the environment, as these systems are not fully autonomous. At Level 2 (Partial Automation), the vehicle can manage both steering and acceleration/deceleration simultaneously under certain conditions. The driver must remain vigilant and be ready to take control when necessary. Examples include advanced adaptive cruise control and lane-keeping assistance. Level 3 (Conditional Automation) vehicles can perform most driving tasks autonomously under specific conditions, such as highway driving. The driver can disengage from active control, allowing the system to operate independently. However, the driver must be ready to take over if the system encounters a situation it cannot handle. At Level 4 (High Automation), the vehicle is capable of full autonomy in specific scenarios or environments, such as urban areas or dedicated lanes. The system can manage all aspects of driving without human intervention within these predefined conditions. Outside of these scenarios, human intervention may be required. Level 5 (Full Automation) represents full automation, where the vehicle can handle all driving tasks in all conditions without human intervention. Level 5 vehicles do not require a steering wheel or pedals, as there is no need for human control. In one embodiment, the level of autonomy can be another vehicle attribute, and the system 100 can determine trip data across travel zones based on the different levels of vehicle autonomy.

Figure 3:
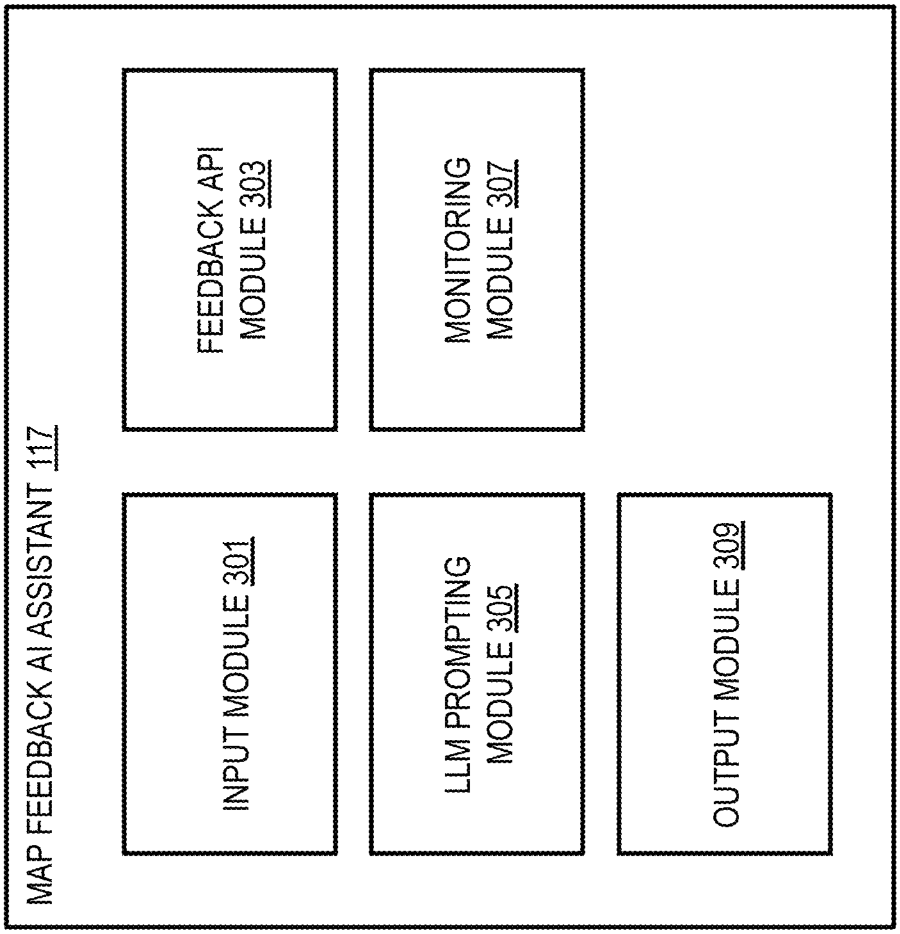
FIG. 3 is a diagram of a mapping platform capable of providing LLM-based map feedback reporting, according to one example embodiment.

FIG. 3 is a diagram of a map feedback AI assistant 117 capable of providing LLM-based map feedback reporting, according to one example embodiment. By way of example, the map feedback AI assistant 117 includes one or more components for performing the various embodiments described herein. It is contemplated that the functions of these components may be combined or performed by other components of equivalent functionality. In one embodiment, the map feedback AI assistant 117 includes an input module 301, feedback API module 303, LLM prompting module 305, monitoring module 307, and output module 309. The above presented modules and components of the map feedback AI assistant 117 can be implemented in hardware, firmware, software, circuitry, or a combination thereof such as but not limited to the hardware illustrated in FIGS. 9-11. Though depicted as a component of the navigation application 107 in FIG. 1, it is contemplated that the map feedback AI assistant 117 may be implemented as a module of any other component of the system 100 or equivalent. In another embodiment, one or more of its modules or components may be implemented as a cloud based service, local service, native application, or combination thereof. The functions of the map feedback AI assistant 117 and its modules are discussed with respect to the figures below.

Figure 4:
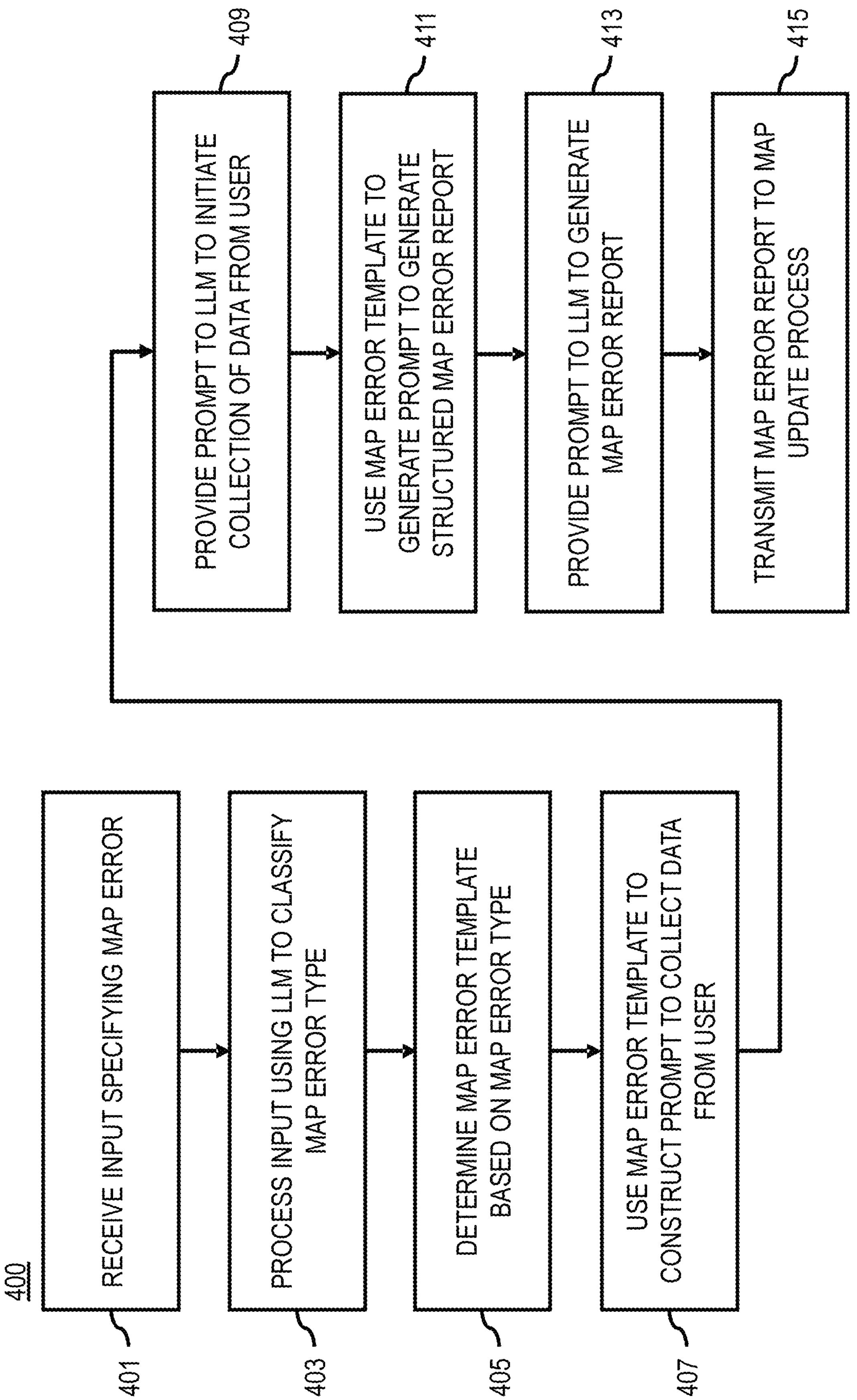
FIG. 4 is a flowchart of a process for providing LLM-based map feedback reporting, according to one example embodiment.
Figure 10:
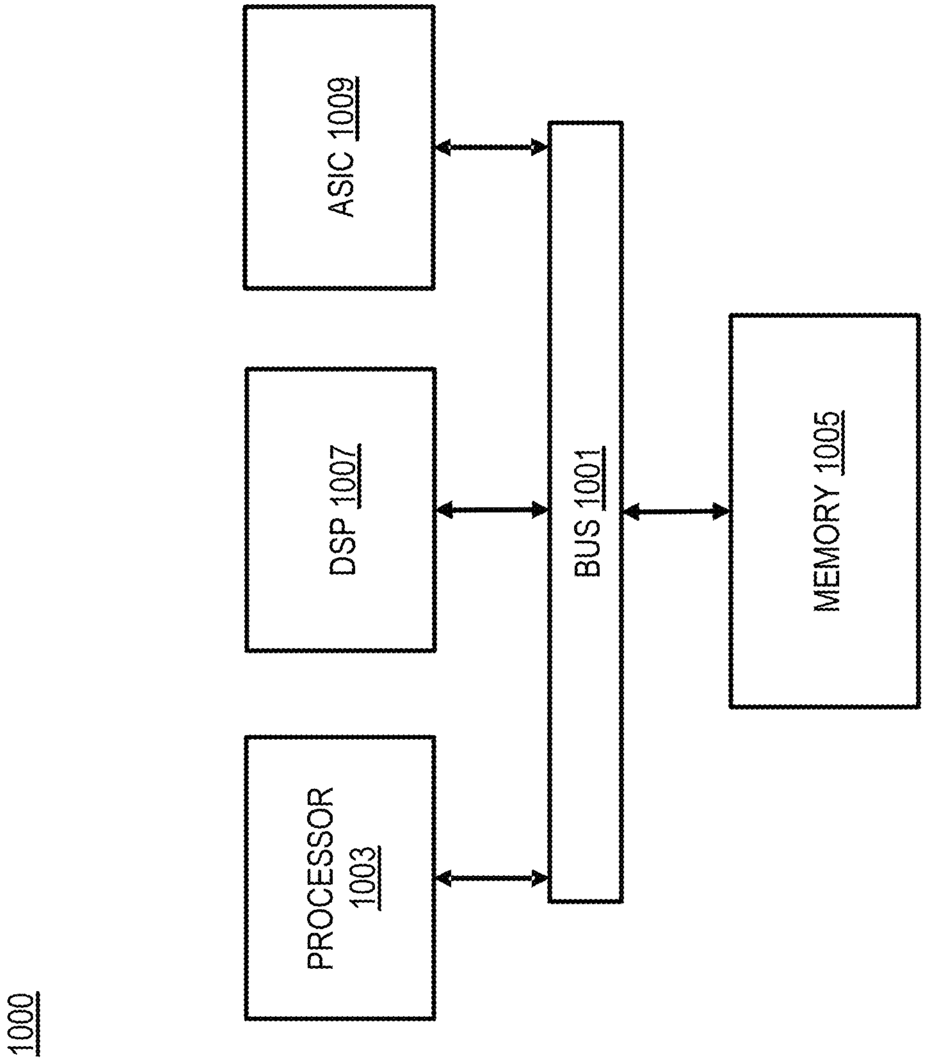
FIG. 10 is a diagram of a chip set that can be used to implement an example embodiment.

FIG. 4 is a flowchart of a process for providing LLM-based map feedback reporting, according to one example embodiment. In various embodiments, the map feedback AI assistant 117 and/or any of its modules may perform one or more portions of the process 400 and may be implemented in, for instance, a chip set including a processor and a memory as shown in FIG. 10 or in circuitry, hardware, firmware, software, or in any combination thereof. As such, the map feedback AI assistant 117 and/or its modules can provide means for accomplishing various parts of the process 400, as well as means for accomplishing embodiments of other processes described herein in conjunction with other components of the system 100. Although the process 400 is illustrated and described as a sequence of steps, it is contemplated that various embodiments of the process 400 may be performed in any order or combination and need not include all of the illustrated steps.

In step 401, the input module 301 receives an input from a user, the input specifying a map error or other map feedback. For example, when users wish to report either an incorrect road sign or a bad road condition, they can initiate a conversation with the map feedback AI assistant 117 (e.g., by providing a natural language voice input). Examples of types of natural language input that can be used to provide map feedback include but are not limited to the following:

(1) Direct Statements: Simple and Clear Descriptions of the Error:

"This road is closed for construction."

"The speed limit here is wrong, it's actually 25 mph."

"There's a new coffee shop on this corner."

(2) Descriptive Phrases: Adding More Detail for Clarity:

"The gas station marked near the big oak tree isn't there anymore."

"This whole section of highway is missing from the map."

"The restaurant at this exit is permanently closed."

(3) Conversational Language: Speaking as the User would to Another Person:

"Hey, I think the directions to this address are wrong."

"I noticed this new park, can you add it to the map?"

By way of example, a natural language input, delivered through spoken voice commands or queries, is received and processed by the input module 301 via a multi-step process. Firstly, a speech recognition engine converts the user's voice into a digital audio signal. This signal undergoes filtering to minimize background noise, followed by segmentation into discrete units of speech. Subsequently, specialized speech recognition models, often leveraging artificial intelligence, transcribe the audio segments into text. Next, a natural language understanding (NLU) component, such as an LLM, analyzes the transcribed text to discern the user's intent. This intent analysis is coupled with entity extraction, where the NLU pinpoints key elements such as locations, place types, or points of interest.

In step 403, the LLM prompting module 305 processes the input using an LLM to classify a map error type of the map error. To classify map errors by type, an LLM can analyze natural language input provided by users. Firstly, the LLM interprets the user's intent, looking beyond isolated keywords to understand the overall meaning conveyed within the sentence or phrase. This intent analysis leverages the LLM's general training and understanding of language structure, making it capable of understanding common error reporting patterns without specialized training. Next, the LLM can extract key elements like locations, business names, and specific details (e.g., speed limits). By analyzing the relationship between these extracted entities, the LLM can then classify the error type. To achieve this, the LLM can match error descriptions to error categories such as "Incorrect Address," "Missing Place," "Road Closure," or "Incorrect Business Hours." In one embodiment, the LLM prompting module 305 can use prompt engineering that specifies the error categories and associated characteristics/description in the LLM prompt to provide context to the LLM without having to specifically train the LLM on the error categories.

The error types or categories, for instance, can be extracted from data definitions provided specified in a corresponding map feedback API (e.g., feedback API 123). A map feedback API is an application programming interface that allows developers to integrate map error reporting and feedback mechanisms directly into their applications (navigation apps, location-based services, etc.). It provides a structured way for users to submit feedback about map issues they encounter and for the application to communicate that feedback to the map update system or pipeline of a map service provider. Table 2 below lists some but not exclusive examples of map feedback/error types defined in an example feedback API. It is noted that the specific error types, codes, and description can vary between different map systems and service providers.

TABLE 2

| Error Type | Error Code | Description |
|---|---|---|
| Road | 10 | A road is missing |
| | 11 | This road's information is incorrect |
| | 12 | There is no road here anymore |
| | 43 | Turn restriction info missing or wrong |
| | 44 | Other restriction (legal, or so on) missing or wrong |
| Address/City | 20 | The address is missing |
| | 21 | The address is incorrect |
| | 22 | There is nothing at this address |
| | 23 | Postal Code is incorrect |
| | 24 | City is missing |
| | 25 | City is incorrect |
| Places | 30 | A place is missing |
| | 31 | This place's information is incorrect (including Venue places) |
| | 32 | This place is closed |
| | 33 | Place is at an incorrect location |
| | 34 | Place is a duplicate of another |
| Turns | 43 | Turn restriction information is missing or wrong |

In step 405, the feedback API module 303 determines a map error template based on the map error type. In one embodiment, the map error template specifies, at least in part, one or more data fields for reporting the map error using a structured data format for the map error type. As with the map error types, the map error template can be retrieved or otherwise determined from the data definitions provided in the corresponding map feedback API 123. For example, the map feedback API 123 can include general feedback submission data definitions for data items common to all feedback reports such as type, location coordinates (e.g., latitude and longitude specified in world coordinates), etc. The map feedback API 123 can then provide specific data definitions for each map error type. For example, a map error template for basic road sign feedback can include but are not limited to the following data fields:

Road sign type
Current value shown
Correct value that should be shown
Units for both values
Temporary or Permanent sign.
Start and End points for the sign As another example, a map error template for basic road condition feedback can include but are not limited to the following data fields:

Type of obstruction/hazard (potholes, roadblocks, incorrect lane etc.)
Surface type (tar, asphalt, concrete etc.)
Severity ranging from low (1) to high (100)

In one embodiment, the map feedback API 123 can also include more detailed descriptions for each data field in map error template which can then be provided as additional context in the prompts for an LLM to generate and under conversations about map feedback/error reporting. Table 3 illustrates example data definitions for a map error template for reporting road-specific properties.

takes two forms: (1) questions for the user that the LLM has formulated to extract the data; and (2) the requested data time extracted by the LLM directly from the user's initial input (e.g., a street name) or other contextual information (e.g., user context 119 and/or mobile device context 111). The questions can then be displayed or otherwise presented to the user and the user's response is captured.

In other words, based on the type of feedback the user wants to submit, the LLM then asks for all the necessary information one field at a time using interactive input collection. In one embodiment, the map feedback AI assistant 117 or equivalent tool supports multiple modes of interaction (speech, text etc.). If the user does not understand what some of the required inputs mean, the map feedback AI assistant will provide or prompt the LLM to provide a brief explanation and ask for that input again. After all the required information is collected, the map feedback AI assistant 117 will also ask the user to provide any optional information if it is available, which may help with faster processing of the feedback.

If a user wishes to provide one of the optional fields later, the map feedback AI assistant 117 will proceed with submitting the feedback with all the required input fields and any optional fields. The map feedback AI assistant 117 has context that the user may wish to provide more input later for the same request. When the user is ready to provide further input, the map feedback AI assistant 117 will only ask for the input that has not already been provided, then submits an update to the feedback request from earlier.

TABLE 3

| Data Field | Required | Data Type | Description |
|---|---|---|---|
| error | Yes | String | Road Map Feedback error code (10, 11, 12, 43, 44) |
| referenceIDs | No | String[ ] | Reference IDs for roads for which feedback is submitted. We recommend that you provide a reference ID to speed up the feedback processing. |
| roadname | No | String | Road name |
| languageCode | No | String | ISO 639-2/B language for road name. Must be specified if you provide names for the road in different languages. |
| type | No | String | Road type category |
| speedCat | No | String | Average driving speed indication as shown in the Speed Category values table. |
| dir | No | String | Allowed travel direction<br>0 - both ways<br>1 - one way |

In step 407, the LLM prompting module 305 uses the map error template to construct one or more prompts for the LLM to generate one or more questions to collect one or more data items for populating the one or more data fields from a user. For example, the data fields including required and optional data fields can be provided as context to the LLM by embedding the map error template into an initial prompt with iterative prompts targeting each required piece of information in the map error template. An example prompt based on the example of road-specific error reporting illustrated in Table 3 is provided in Table 4 below:

TABLE 4

| |
|---|
| Error Type: Incorrect Road |
| Data Fields: |
| error, required, string, Road Map Feedback error code (10, 11, 12, 43, 44) |
| roadname, optional, string, Road name |
| Task: Generate questions to gather the corrected road name information from the user |

In step 409, the LLM prompting module 305 provides the one or more prompts to the LLM to cause the LLM to initiate a collection of the one or more data items from the user using the one or more questions. For example, the LLM prompting module 305 sends the generated prompts (e.g., one at a time) to the LLM, and receives the LLM's output, which generally In one embodiment, the input module 301 optionally determines contextual information about the map error from one or more sensors of a vehicle, a device, or a combination thereof associated with the user providing the input. In this way, the one or more prompts, the one or more additional prompts, the one or more data items, the map error report, or a combination thereof are based on the contextual information.

In other words, the map feedback AI assistant 117 (e.g., via the LLM) may receive the user/driver conversational input and at the same time collect a series of data items from the navigation application 107 or sensor of the mobile device 101, including but not limited to time of report, location of report, current speed/heading, current (calculated) route, previous locations/speeds/headings, etc. Based on the user input, the LLM may determine which type of map error is being referred to and can start to collect additional information to provide a map error report that, e.g., a map feedback API 123 would accept. In some cases, as discussed above, the LLM may be fed with map error templates specific to the error type, so that the dialog between user and LLM may be focused on providing only the information or data items specified by the map feedback API 123 for the particular map error type.

In one embodiment, depending on the type of contextual information collected by the map feedback AI assistant 117, the contextual information can be used to reduce the number of questions about the feedback presented to the user or to validate the information provided by the user.

For example, in another feature, the map feedback AI assistant 117 could be made aware of the field of view of the user at any given moment based on the user context (e.g., location, routing plan, speed, orientation, 3D models, etc.) through various sensors, at the time of report or at the time of traveling a road link. The field of view may be estimated from the user context data collected through sensors and the map data (e.g. roads, road geometry, buildings, topography, etc.) describing to the location associated with the sensor data. Similarly, sensors that can be used to also determine the field of view of the user can include but are not limited to the mobile device's or vehicle's external internal and external sensors such as: (1) sensors for detecting vehicle position, direction, speed, steering wheel angle, etc.; (2) externally facing cameras, LIDAR, radar, etc.; and (3) user facing sensors like driver facing cameras (to look at eyes positions and movements, a.k.a., gaze tracking); etc.

This input could be used to determine what the user has been referring to in his/her explanations or determine whether map features or errors reported by the user would have been visible to the user. If the features or errors would not have been in the user's estimated field of view the report can be given less confidence or provided to other users for confirmation. In other words, in one embodiment, the contextual information can include an estimated field of view of the user when making the map error report. Then the estimated field of view of the user is computed from sensor data of the one or more sensors to validate or confirm the user's report.

In one embodiment, the contextual information includes image data captured by the one or more sensors. In this way, the map feedback AI assistant 117 can couple the user's map report with a proof picture. For example, if a user reports an incorrect speed sign and this user has a phone with front facing camera, the map feedback AI assistant 117 can ask the user to activate that camera (or automatically do so if previously set to do so) in order to capture a proof of that incorrect sign, in order to provide more information when reporting this issue to the system 100. In case this capture was not possible at the time of the report, the system might save that location in order to ask to trigger that camera picture next time it approaches this link (either in the same direction or bi-directionally when relevant, depending on the sign type). Here again, the context of the user's map error report would be used in order to guide the camera system to know which sign is relevant to capture in the entire scene.

In one embodiment, the map feedback AI assistant 117 can leverage multimodal capabilities of the LLM by sending the photo, screenshots of the app, sensor capture, and/or the like to validate the user's map error report.

In one embodiment, the LLM prompting module 305 uses the LLM to iteratively process the one or more data collected from the user to determine a completeness of the populating of the one or more data fields. In case the information is not deemed sufficient, the LLM may interact with the user to obtain more information to complete the report. In some cases the user may not understand the question (e.g. LLM: Is the speed limit temporary or permanent?—User: What is the difference?), the LLM may engage in a sub-dialog to explain the question and obtain a usable answer.

Once the report is completed, the system may send the report to the Map Feedback API. As previously discussed, the one or more data fields of the map error report may include one or more required data fields, one or more optional data fields, or a combination thereof. Then the completeness of the populating of the one or more data fields is based on determining whether the one or more required data fields, the one or more optional data fields, or a combination thereof have been provided by the user during the conversation or provided via automatically gathered contextual information.

If the report is not complete, the LLM prompting module 305 then causes the LLM to generate one or more additional questions to collect the one or more data items from the user until the LLM determines that the populating of the one or more data fields is complete. To assess map error report completeness, the LLM and/or map feedback AI assistant 117 can maintain predefined templates for supported map error types. These templates outline the mandatory and optional data fields required for an error report to be actionable. When processing a user-submitted error report, the LLM is provided with the context of the relevant template. The LLM analyzes the user's natural language input to identify information segments that correspond to fields in the template. By comparing the extracted data to the template's requirements and specifications, the LLM flags any missing or unfilled fields. This completeness determination can be expressed as a confidence score. High-confidence reports with all fields populated can be streamlined for automated updates, while low-confidence reports may be prioritized for validation or confirmation by other users. The LLM adapts to changes in error templates and understands nuances in how users express information, ensuring a robust and flexible completeness assessment system.

Figure 5:
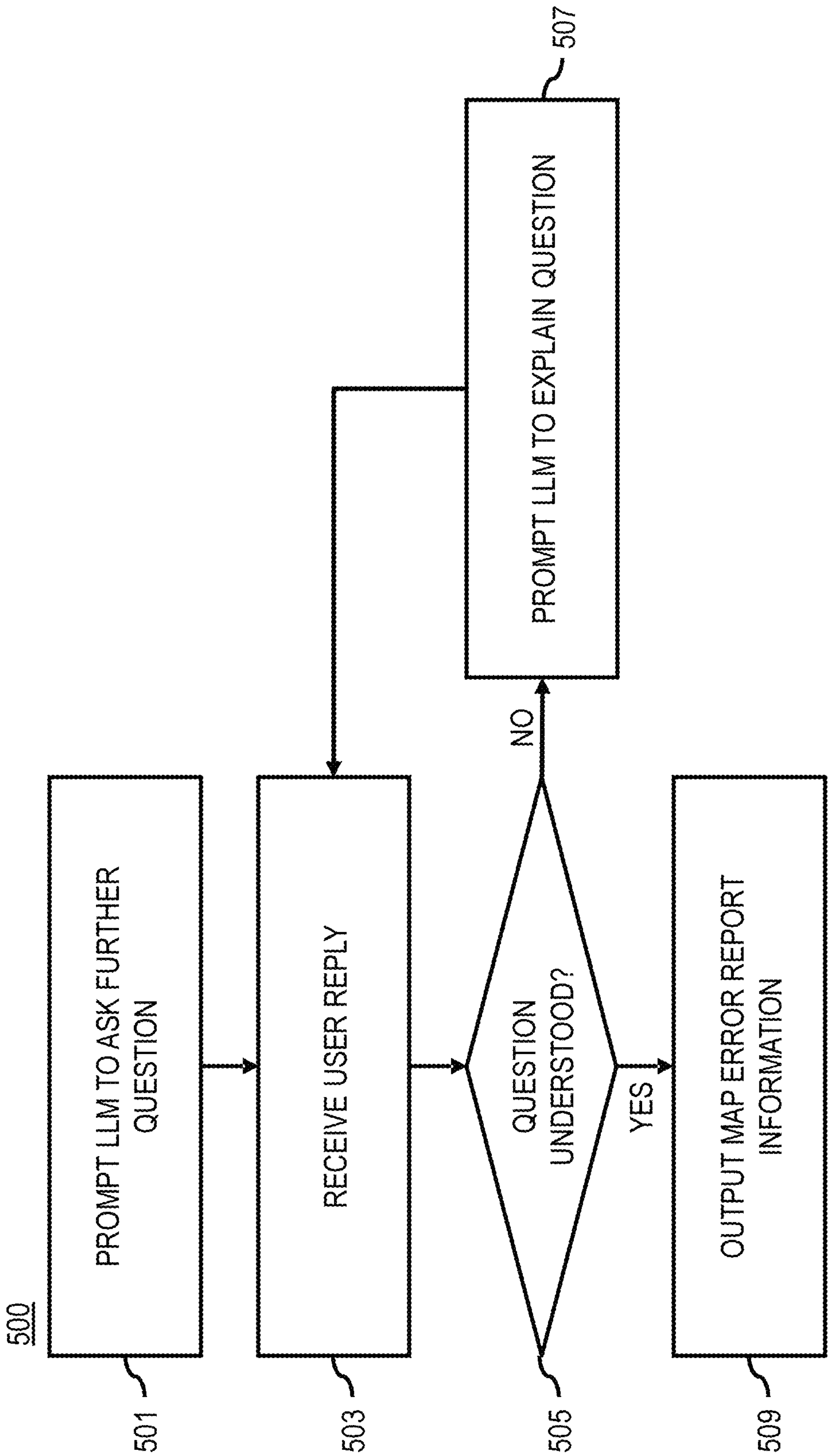
FIG. 5 is an interaction flow for clarifying LLM-based map feedback reporting, according to one example embodiment.

In one embodiment, the collection of the one or more data items comprises prompting the LLM to generate one or more clarifying questions to the user based on a computed accuracy of the one or more data items. FIG. 5 is an interaction flow 500 for clarifying LLM-based map feedback reporting, according to one example embodiment. In various embodiments, the map feedback AI assistant 117 and/or any of its modules may perform one or more portions of the process 500 and may be implemented in, for instance, a chip set including a processor and a memory as shown in FIG. 10 or in circuitry, hardware, firmware, software, or in any combination thereof. As such, the map feedback AI assistant 117 and/or its modules can provide means for accomplishing various parts of the process 500, as well as means for accomplishing embodiments of other processes described herein in conjunction with other components of the system 100. Although the process 500 is illustrated and described as a sequence of steps, it is contemplated that various embodiments of the process 500 may be performed in any order or combination and need not include all of the illustrated steps.

In step 501, the LLM prompting module 305 prompts the LLM to ask further clarifying question(s). The prompts can use the previous question and user reply as additional context to generate the clarifying questions. Thus, one feature is the fine tuning of the location and attributes through dialog interface by providing clarifying questions when needed, in order to provide accurate attributes, location, and the depth needed to submit actionable map error reports via the feedback API 123.

In some cases, the map feedback AI assistant and/or LLM might also ask for additional elements and context based on its one analysis of the user's replies and the requirements specified in the map error templates.

In step 503, the input module 301 receives a user reply in response to the clarifying questions(s). Feedback loops exist in order to make sure the updated content is properly reflecting the intended changes. For example, when receiving a road blockage report, the LLM may be prompted to ask, "I have now blocked the route in front of you, is it correct now?" Other clarifications could be related to the duration of the event: "Is this suggested update likely to end in a foreseeable future?"

The objective is to get to the most concrete location assignment with the lowest number of discussion exchanges, based on an understanding of the user's comments thanks to the LLM and an understanding of the location context (e.g., roads, 3D buildings, map features, etc.) thanks to the map data of the geographic database 109 and related APIs.

In step 505, the LLM prompting module 305 interacts with the LLM to determine whether the user reply indicates that the user has understood the question. To determine if a user has understood a clarifying question posed in response to their map error report, the LLM analyzes the user's response. This analysis focuses on relevance (does the response address the question), completeness (does the response provide all the requested information), and the presence of keywords or phrases commonly associated with understanding or misunderstanding. The LLM may also employ intent classification and, in some cases, sentiment analysis to further gauge the user's comprehension.

In step 507, if the LLM determines that the user has not understood the question, the LLM prompting module 305 causes the LLM to explain the question to the user. For example, the LLM can employ strategies such as rephrasing the question, providing clarifying examples, providing an explanation of questions and/or terms used in the question, and/or flagging the report for human moderator review.

In step 509, if the LLM determines that the user has understood the question, the output module 309 provides the collected data items as an output of feedback/map error report information.

Returning to the process 400 of FIG. 4, in one embodiment, as the map feedback AI assistant 117 is collecting the data items from conversation with the user, the output module 309 can generate a visual representation of the map error, a map correction based on a map error, or a combination thereof, and provides the visual representation in a user interface of a device for review by the user. The visual representation can also be iteratively updated in real-time during the collection of the one or more data items from the user. In other words, another feature is for the map feedback AI assistant 117 to provide real-time visualization or overlay of the changes done in response to the user's suggested changes. This can help users validate their entry or make additional changes if needed. For example, being able to visualize augmented reality (AR) overlays based on the user's feedback (e.g., after each sentence) can help provide direct feedback for the user to verify and possibly fine-tune the suggested map correction (e.g., accurately positioning a starting location for a sign).

In one embodiment, the completion of a report is made across multiple sessions. For example, a user is reporting a change in speed limit sign at a given location. The map feedback AI assistant 117 asks the user to tell when this speed limit is applied and when it is ending. If the user is not sure about the start/end location, the user can come back to this update next time the user takes this route. The map feedback AI assistant 117 would then be aware of the context, understanding that it is about the continuation of a previous update request and would react accordingly. In other words, the collection of the one or more data items occurs over a plurality of data collection sessions; and wherein the one or more data items, the one or more questions, the map error report, or a combination thereof is stored for access across the plurality of data collection sessions.

The system 100 might also decide to ask this clarifying query to another driver passing through that road segment, if the context allows it (e.g., the system can ask whether a driver who was not involved in the initial reporting answer a clarifying question with a limited number of interactions with the system).

In one embodiment, the collection of the one or more data items include generating one or more additional questions by the LLM to disambiguate the one or more data items collected from the user. For example, another feature is about disambiguation when multiple map features (e.g., signs) are next to each other (in space or time) that could be the subject of a map error report. Therefore, the system 100 might need the user's input to clarify which feature or sign the user is talking about. In addition, if there are multiple incomplete reports from a given user, the LLM might need to disambiguate which one of those the user is now talking about.

In one embodiment, the input module 301 validates the one or more data items collected from the user by comparing the one or more data items to one or more known ranges, one or more known values, or a combination thereof. The input module 301 can evaluate whether there are "highly unlikely proper reports." For example, if a user reports some very unlikely updates like 120 kph speed in a city or 24 h open shop for a POI category which is unlikely to be open that long, the system might: (1) simply gather the input with as many details as possible; (2) decide to ask for additional information proving those statements; and/or (3) challenge the user.

In one embodiment, the map feedback AI assistant 117 can employ one or more user validation methods if the confidence of a map error report is below a designated threshold value. This validation can be used, for instance, when the system 100 needs to fuse a report across multiple users and/or when the LLM could ask a next driver to validate.

In another embodiment, the map feedback AI assistant 117 can ask some questions to the user in order to increase the reliability or confidence in the user's feedback. Similar to captchas, the system 100 might want to trigger some questions when it has some doubts about the validity of some user inputs or when it is sure about some ground truth value and wants to "test" that this user is reporting real facts, e.g., by asking "Could you please tell me which sign is under the speed limit sign you just mentioned?" when the system 100 has information on the sign it is asking about.

In one embodiment, the system 100 can leverage historical mobility patterns (e.g., a user's mobility graph indicating the places visited and/or routes taken by a user over a designated period of time) to provide more context. For example, knowing that a user is taking a given route (or set of routes) to go to work could provide relevant information to the system in the sense that user would be familiar with an area, its speed limits (or other signs), and hence would be more confident in highlighting a sudden sign change. In addition, the LLM could ask questions in a different way to people familiar or unfamiliar with a given area of interest.

In one embodiment, lane level positioning can also be used as additional contextual information. Knowing which lane a user was traveling on might be relevant to understanding which sign the user might be referring to, e.g., in case of some fuzzy report like "this sign is incorrect".

In step 411, the LLM prompting module 305 uses the map error template to construct one or more additional prompts for the LLM to generate a map error report comprising the one or more data items in the structured data format. After collecting the data items from the user to make an actionable map error report, the map feedback AI assistant 117 can then generate prompts for the LLM to provide the data items in a map data format that can be used by the corresponding map feedback API 123 (i.e., that conforms to the data requirements and specification in the corresponding map error template).

For example, a key technical challenge in processing map error reports lies in transforming unstructured user input into a format that map feedback APIs 123 require. To address this, when presented with an unstructured map error report, the LLM is provided with both the raw report text and the relevant error template as context.

The LLM is then instructed to extract specific data items from the user's report and map them to the corresponding template fields. It leverages its natural language processing capabilities, including Named Entity Recognition (NER), to identify relevant entities and associate them with the structured data fields. The LLM performs necessary data type conversions (e.g., geocoding a street address into latitude and longitude). In cases of ambiguity or incomplete information, the LLM flags fields accordingly or indicates the absence of optional data.

In the example scenario of a reporting a map error that is a missing place, an example map error template is shown in Table 5 below.

TABLE 5

```
{
  "errorType": "MissingPlace",
  "placename": (string, required),
  "category": (string, required), // E.g., restaurant, gas station, park
  "address": {
      "streetAddress": (string),
      "city": (string),
      "state": (string),
      "zipCode": (string)
    },
  "latitude": (number),
  "longitude": (number)
}
```

The natural language user map error report is as follows: "You're missing a great new bakery! It's called Sweet Treats and it's on the corner of 5th Avenue and Oak Street in Springfield." The LLM prompting module 305 can then generate the prompt to format the unstructured map error report into the corresponding map error template by adding the report and template as context for prompt that initiates the task as illustrated in Table 6 below.

TABLE 6

Task: The user is reporting a missing place. Structure the data from their report to match the provided template.
User Report: "You're missing a great new bakery! It's called Sweet Treats and it's on the corner of 5th Avenue and Oak Street in Springfield."

TABLE 6-continued

Error Template:

```
{
  "errorType": "MissingPlace",
  "placename": (string, required),
  "category": (string, required), // E.g., restaurant, gas station, park
  "address": {
      "streetAddress": (string),
      "city": (string),
      "state": (string),
      "zipCode": (string)
    },
  "latitude": (number),
  "longitude": (number)
}
```

In step 413, the LLM prompting module 305 provides the one or more additional prompts to the LLM to cause the LLM to initiate a generation of the map error report. In the example above, the prompt illustrated in Table 6 would be provided to the LLM to cause the LLM to generate the corresponding map error report in the format of the map error template (e.g., including converting the address to the proper format) as shown Table 7 below.

TABLE 7

```
{
  "errorType": "MissingPlace",
  "placename": "Sweet Treat",
  "category": "Bakery",
  "address": {
      "streetAddress": "123 5th Avenue",
      "city": "Springfield",
      "state": "IL",
      "zipCode": "12345"
    },
  "latitude": -184.444,
  "longitude": 73.563
}
```

In step 415, the output module 309 transmits the map error report to a map feedback system (e.g., via the map feedback API 123). The transmission places the map error report as a feedback request 125 in the mapping pipeline for local and/or cloud map data update, and/or for any other location-based service or task.

In one embodiment, the system 100 learns over time how to get the most efficient feedback from drivers (e.g., self-improvement feature). For example, the more concise the LLM questions are, the fewer follow-ups are needed. The system 100 can also learn how to optimally phrase the LLM based questions for a given context/sign to update, per geography, per language, possibly per driver type or driver profile. For example, a truck driver or other professional drivers like ridesharing drivers might be able to report "complex" map updates in a single sentence while less frequent drivers might need three-four follow-up interactions to capture the same update.

In other words, in one embodiment, the LLM prompting module 305 iteratively modifies the one or more prompts, the one or more additional prompts, or a combination thereof to reduce a number of the one or more questions used during the collection of the one or more data items. For example, the system 100 can analyze successful past interactions. When a map error report is collected with minimal questions, it can examine the following: (1) prompt brevity-were initial prompts concise and targeted?; and (2) user response patterns-how did the driver structure their initial error report that lead to quick resolution and reporting? The system 100 can treat the prompt generation as a reinforcement learning problem. It receives positive "rewards" when a (usable) feedback report is collected with a low number of questions. This encourages the map feedback AI assistant 117 to refine its prompting strategies for efficiency.

In addition or as an alternate to the error reporting embodiments described above, the monitoring module 307 can actively monitor user and mobile device behavior (e.g., driver and/or vehicle behavior) to detect mismatches between observed behavior and behavior expected or predicted based on the map data of the geographic databases 109*a* or 109*b*. For example, rules or heuristics can be set up to determine mismatches (e.g., an observed/detected speed exceeds a mapped speed limit by more than a designated threshold, a mobile device 101 arrives at a POI more than a threshold value outside of its operating hours as recorded in the map data, etc.). After the monitoring module 307 automatically detects the mismatch (e.g., without the user manually reporting a map error), the monitoring module 307 can interact with the LLM prompting module 305 to initiate a conversation with the user of the mobile device 101 to confirm whether the automatically monitored mismatch or map error is due to the map data or other causes (e.g., user/driver error, autonomous driving mode error, etc.). Examples of mismatches that can be automatically monitored and detected include but are not limited to: (1) turns right/left/U-turn when the map data indicates that the turn is forbidden; (2) changes lane when the map data indicates that lane changes are forbidden; (3) overtakes another vehicle when the map data indicates that overtaking is forbidden; (4) parks when the map data indicates that parking at the location is forbidden or otherwise restricted; (5) does not stop where the map data indicates that a stop sign is posted; (6) travels in the wrong direction of road (e.g., one-way road) indicated by the map data; (7) enters a road/zone that is indicated as banned (e.g., for a particular vehicle type such as a truck) in the map data; (8) does not yield to another vehicle detected at a location that the map data indicates as a yield zone; etc.

In one example scenario, the monitoring module 307 can monitor the travel path of a mobile device 101 and detects that the mobile device 101 has parked in the garage of a shop at a time that the map data indicates that the shop should be closed. The monitoring module 307 causes the map feedback AI assistant 117 (e.g., via an LLM) to ask (1) whether the user is visiting the shop, and (2) whether the shop is open or whether the user can provide the opening hours for the shop.

Table 8 below is a transcript of actions taken by a conversational AI system (e.g., comprising an LLM for understanding and conversation, and a tool for adapting the LLM for map feedback/error reporting) designed to handle map feedback according to the various embodiments described herein. The transcript of Table 8 illustrates the following processes:

System Initialization

"NewConversationCreated": A new conversation with a user is started.

"conversation_id": A unique ID is assigned to track this interaction.

"run_settings": Configuration data including the AI models used, location, and other parameters.

Agent Starts Processing

"AgentExecutor", "LLMChain": The central "Agent" module begins, using an LLM to understand the user's intent.

"Thought": The AI system formulates an initial understanding of the user's map error report (incorrect opening hours).

"Action: HUMAN_INPUT": The system determines it needs more information and generates a question: "Could you please provide the opening hours for ABC Comics as shown in the Navigation app?"

Interaction Loop: This Pattern Repeats a Few Times:

"Tool: HUMAN_INPUT": The AI system prompts the user for input.

"NewToolInputCommand": The system receives the user's response.

"LLMChain": The LLM may process the user's input for further understanding.

"AgentAction": The system generates the next action, which could be another question for the user or invoking a different tool.

Invoking a Specialized Tool

"Action: POI_BASIC": The system identifies the need for a specific tool designed to format map error reports. It provides the tool with the place name and the opening hours to report. In one embodiment, the specific tool can be associated with specific types of map features (e.g., POIs, road attributes, road signs, terrain features, buildings, etc.) and be implemented as programming functions. These programming functions can then be made accessible to the map feedback AI assistant 117 (or equivalent conversational AI system), for instance, via a file, an application programming interface (API), code library, and/or the like. By way of example, a visual or code-based interface can enable developers to create structured data template for each map error/feature type. The structured data templates integrate with the map feedback API requirements (e.g., feedback API 123) of the mapping system or geographic database 109. The tool uses LLM integration and prompt engineering to bridge unstructured text to templates. This comprises access to LLMs (e.g., LLM 115) as either cloud services or locally deployable modes and a prompting library or equivalent. The prompting library is a code library that craft effective LLM prompts to map unstructured user interaction data to structured map feedback reports. The LLM prompts are generated using the tool (e.g., via the prompting library) based on parameters such as but not limited to the map error template of interest, what data of the map feedback report is already filled, and the user's conversational input. Based on the elements described above, the specific tool can also be referred to as a map error type-specific input formatting function. Thus, when the map feedback AI assistant 117 uses the map error template to construct one or more additional prompts for the LLM to generate a map error report, the map feedback AI assistant 117 invokes a map error type-specific input formatting function to programmatically and automatically generate map feedback API-compliant map error reports from unstructured conversational input by, for instance, processing the input into the structured data format of the map feedback API.

Success and Wrap-Up

"AgentFinished": The system reports the error successfully.

"Final Answer": The system generates a response to the user: "Thank you for reporting this. The opening hours . . . will be updated . . . ."

"structured_output": The final result is data formatted for the map feedback system to submit to the map data provider.

TABLE 8

• {"event": "NewConversationCreated", "error": null , "conversation_id": "4ceacc06-2d91-4322-8d4a-cdcd0ae79fa8", "run_settings": {"here_agent": ' feedback-vi", "model": "LLM-Model-X", "user_location": "52.51604, 13.37691 ", "user_time": "2024-02-13T07:53:40.025510+ol:OO", "input_mode": "websocket", ' streaming": true, "temperature": 0.0, "mock": false, "campaign": "dev-5f87b546' }}""""""""""""""""""""""""""""""""""
• {"event":"ChainStarted" ,"message":" AgentExecutor"}
• {"event":"ChainStarted" ,"message":"LLMChain"}
•{"event":"ChainEnded" message":
• {"event":" AgentAction" ,"message":"Thought: The user seems to be reporting an issue with the opening hours of a point of interest (POI) in the Navigation app. I should ask for more details
to respond this issue accurately.\n \nAction:\n"'\n{\n \"action\": \"HUMAN!_INPUT\" ,\n \"action_input\": {\n \"query\": \"Could you please provide the opening hours for ABC Comics as shown in the Navigation app?\"\n }\n}\n""""}""""""""""
• {"event":"ToolStarted" ,"tool":"HUMAN_INPUT" ,"message":' {'query': 'Could you please provide the opening hours for ABC Comics as shown in the Navigation app?'}"}""""""""""""""""""""""""""""""""""""""""""""""""""""""""""""""
• ("event": "NewToolInputCornmand", "error": null, 'message": "Could you please provide the opening hours for ABC Comics as shown in the Navigation app?")
• {"event":"ChainStarted" ,"message":"LLMChain"}
• {"event":"ChainEnded" ,"message":"LLMChain"}
• {"event":"AgentAction" ,"message":"The user has provided the opening hours as shown in the navigation app. I should now ask for the correct opening hours to update the information in the app.\n\nAction:\n"'\n{\n \"action\": \"HUMAN_INPUT\" ,\n \"action_input\": {\n \"query\": \"Could you please provide the correct opening hours for ABC Comics?\"\n }\n}\n"' "}""""""""""""""""""""""""""""""""""""""""""".
• {"event": "ToolStarted" ,"tool": "HUMAN_INPUT" ,"message": {'query': 'Could you please provide the correct opening hours for ABC Comics?'}"}• {"event": "NewToolInputCommand', "error": null, "message": "Could you please provide the correct opening hours for ABC Comics?"}
• {"event":"ChainStarted" ,"message":"LLMChain"}
• {"event":"ChainEnded" ,"message": "LLMChain •}
• {"event":" AgentAction","message":"The user has provided the correct opening hours for ABC Comics. I should now use the POI_BASIC tool to respond this discrepancy in the Navigation App.\n\nAction:\n "'\n{\n \"action": \"POI_BASIC" ,\n \" action_input\ ": {\n \" name\": \" ABC Comics\" ,\n \ "opening_hours\": \" 10-18\ "\n }\n }\n "' "}
• {"event":"ToolStarted" ,"tool":"POI_BASIC" ,"message":"{'name': 'ABC Comics', 'opening_hours': '10-18'}"}
• {"event":"ChainStarted" ,"message":"LLMChain"}
• {"event":"ChainEnded" ,"message":"LLMChain"}
• {"event":" Agentfinished" ,"message":"The information about the incorrect opening hours for ABC Comics has been successfully reponed. I should now inform the user that the issue has been reponed and will be updated in the Navigation app. \n\nAction:\n"'\n{\n \"action\": \"Final Answer\" ,\n \"action_input\": \"Thank you for reporting this. The opening hours for ABC Comics in the Navigation app will be updated to reflect the correct hours of 10-18.\" ,\n \"feedback_input\": {\n \"fbld\": \"3\"\n }\n}\n""""}
•{"event":"ChainEnded" ,"message":" AgentExecutor"}
• {"event": "NewMessageRun", "error": null, "final_llm_response": "Thank you for reponing this. The opening hours for ABC Comics in the Navigation app will be updated to reflect the correct hours of 10-18.", "structured_output": "{\n \"fbld\": \"3\' ,\n \'name\": \"ABC Comics\" ,\n \"address\' : null,\n \"doesNotExist\' : null,\n \"openingHours\": \" 10-18\" ,\n \"contactInfo\": null\n}"}

Figure 6:
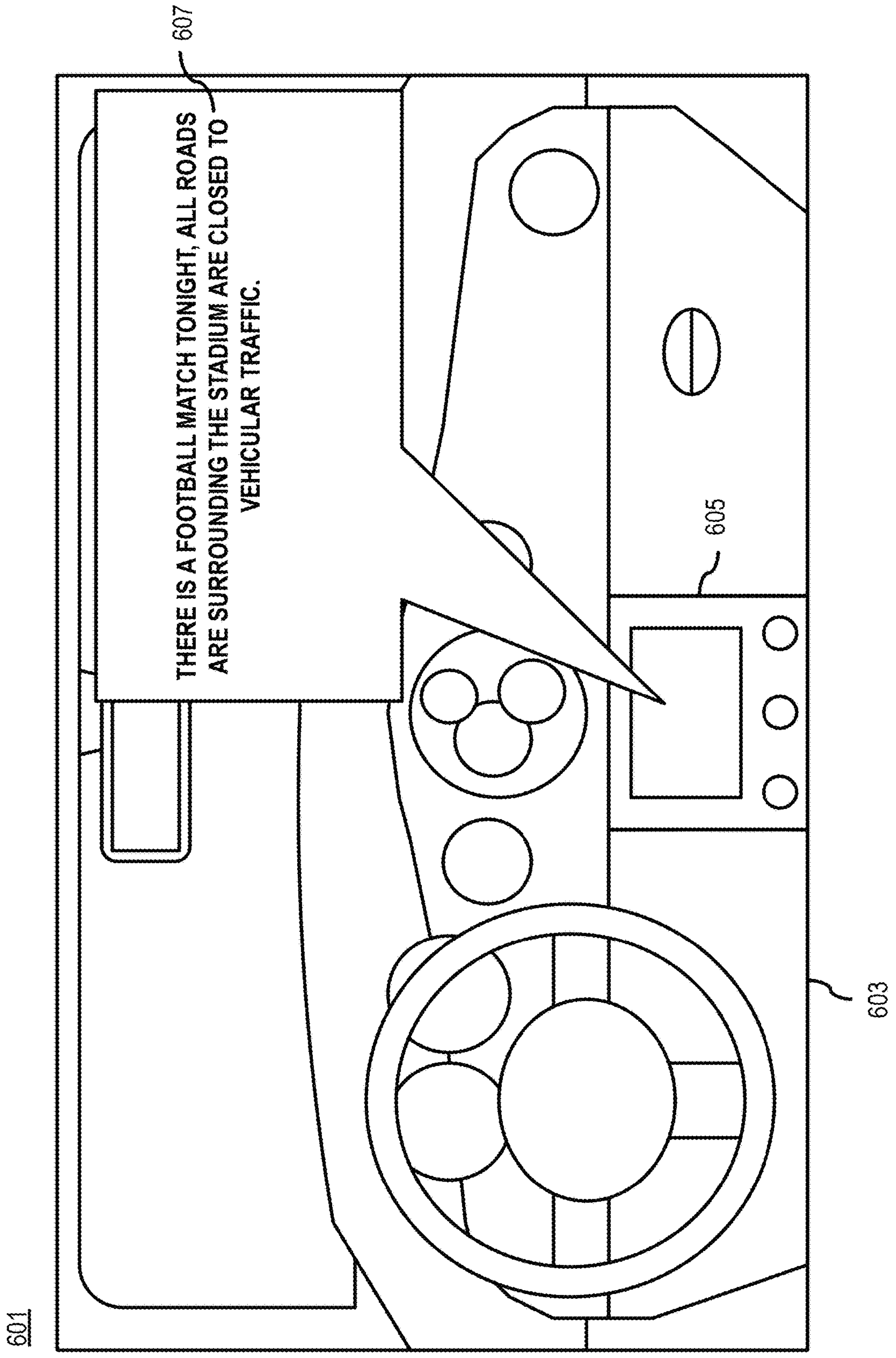
FIG. 6 is a diagram of an example of a user interface for providing LLM-based map feedback reporting, according to one example embodiment.

FIG. 6 is a diagram of an example of vehicle-based user interface 601 for providing LLM-based map feedback reporting, according to one example embodiment. In the example of FIG. 6, a vehicle 603 is configured with navigation software comprising the LLM-based map feedback reporting system according to the various embodiments described herein. It should be understood that also implementations using other types of mobile devices (such as smartphones, wearables, infotainment units, etc.) are also possible and can be similarly operated while, e.g., on board of a vehicle (car, truck, bicycle, bus, etc.) or when carried by a pedestrian. The navigation software includes a map feedback AI assistant and is executed on an in-vehicle system 605 of the vehicle 603 that supports natural language interaction. As indicated in interaction 607, a driver submits a voice map error reporting by stating "There is a football match tonight, all the roads surrounding the stadium are closed to vehicular traffic."

In response, the in-vehicle system 605 recognizes the driver's input as a map feedback report, and processes the input as follows.

Required Tools and their Arguments:

DISCOVER: A tool that leverages HERE Discover API allows searching places.

query: A free-text query at: center of search, results are ranked by their distance from the center GET_MAP_FACE: A tool that returns the drivable road links that make up the face of the contained point. Map faces are 2D decomposition of road graphs.
at: point contained by the face.

SEARCH_EVENT: A tool that searches for live events (e.g., concerts, games etc.) using external APIs.
query: A free-text query
address: A free-form address (e.g., city name)
date: event date.

ROAD_CLOSURE_FEEDBACK: A tool that submits a road closure feedback request to the Map Feedback API.
feedback: A JSON object representing the details of road closure User Context:
User coordinates (vehicle's latitude and longitude): 51.44296, 5.46612
User address (vehicle's reverse geocoded address): PSV-laan 83, 5616 LX Eindhoven, Netherlands
User current time (date and time at which the driver spoke to the AI assistant): 2024-02-16T18:08:38.00Z Trace of tool usage by the Feedback Assistant to arrive at a structured feedback request:

- Call tool DISCOVER
  - query: Stadium
  - at: 51.44296, 5.46612 (user coordinates)
- Return tool DISCOVER
  - A JSON response with full details of the place that represents "Philips Stadion" in the map data: {"title": "Philips Stadion", "position": [51.44199, 5.46605], ...}
- Call tool GET_MAP_FACE
  - at: 51.44199, 5.46605 (coordinates of the stadium)
- Return tool GET_MAP_FACE
  - A JSON response with the list of link identifiers: {"link_ids": ["xxx", "yyy", "zzz", ...]}
- Call tool SEARCH_EVENT
  - query: football match
  - address: Eindhoven
  - date: 2024-02-16
- Return tool SEARCH_EVENT
  - A JSON response with list of events that match the search criteria:
  - {"results": [{"title": "PSV vs. Heracles", "start_time": "2024-02-
  - 16T20:00:00.00Z+1", "address": "...", ...}, ...]}
- Call tool ROAD_CLOSURE_FEEDBACK
  - feedback:

```
{
  "temporary": true,
  "link_identifiers": ["xxx", "yyy", "zzz", ...],
  "start_date": "2024-02-16T18:08:38.00Z+1",
  "end_date": "2024-02-16T22:30:00.00Z+1",
  "remarks": "Due to PSV vs. Heracles."
}
```

Figure 7:
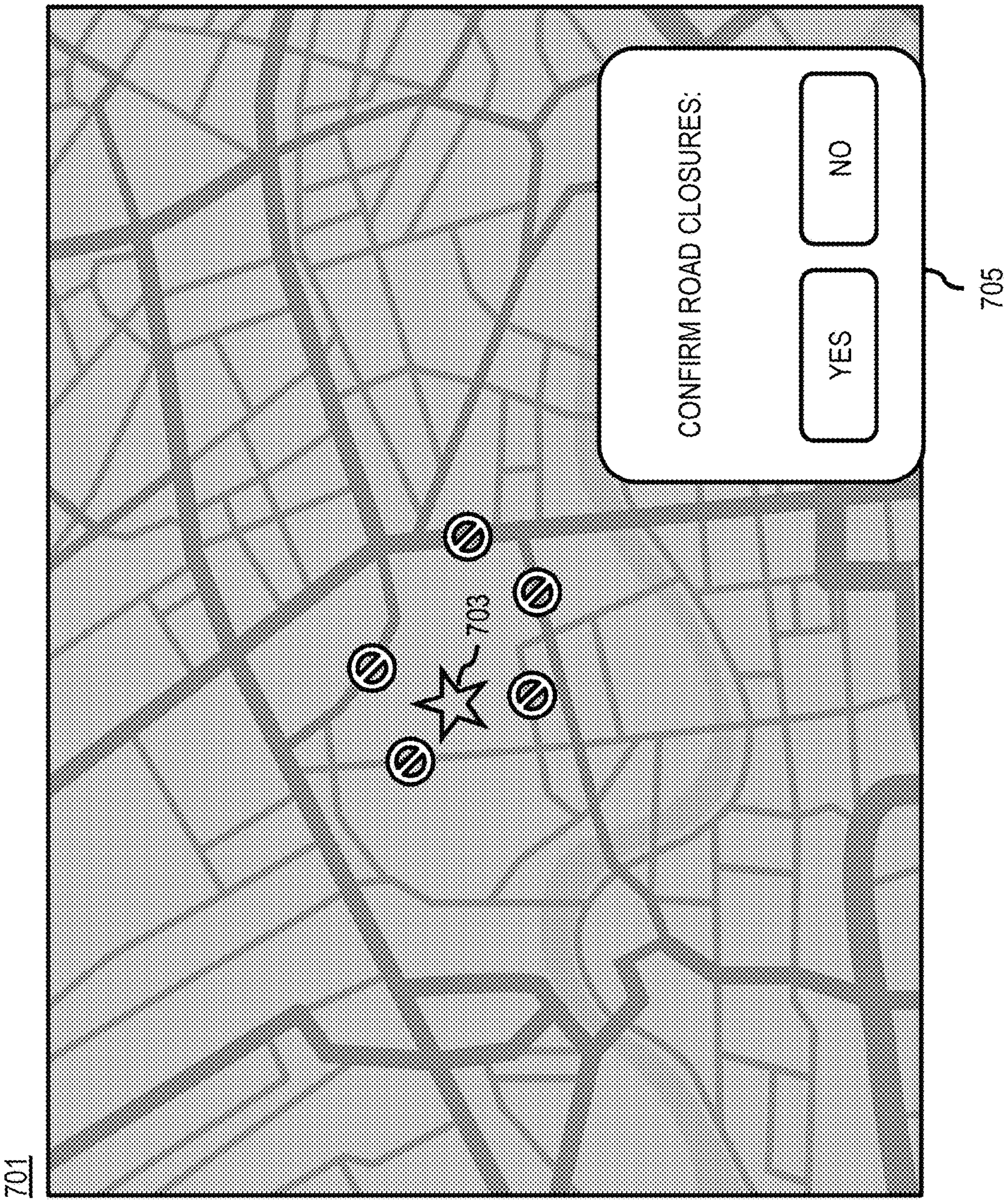
FIG. 7 is a diagram of an example user interface for visualizing LLM-based map feedback reporting, according to one example embodiment.

FIG. 7 is a diagram of an example user interface 701 for visualizing LLM-based map feedback reporting in real-time, according to one example embodiment. In the example of FIG. 7, a driver is traveling within the vicinity of a point of interest (POI) 703 and reports that all roads with vicinity of POI 703 is closed because of a fire at the POI 703. The system 100 processes the map feedback report according to the various embodiments described herein to determine road surrounding the POI 703 and to mark them as closed. The system 100 then visualizes the road closures in the user interface 701 by overlaying "do not enter" symbols over the affected roadways in real-time as the user speaks the map error report. The user interface 701 also provides a user interface element 705 for the user to confirm the road closures and provides options to "yes" to confirm or "no" to not confirm. On confirmation, the map error report can be submitted to the feedback API 123 or used to update the user's local map data.

Returning to FIG. 1, as shown and discussed above, the system 100 includes the navigation application 107 comprising a map feedback AI assistant 117 for providing LLM-based map error reporting alone or in combination with the cloud components 105. In one embodiment, the map feedback AI assistant 117 and/or other components of the system 100 have connectivity or access to a one or more databases (e.g., feedback requests database 131) for storing the map feedback requests 125 generated according to the various embodiments described herein, as well as access to the geographic databases 109*a* or 109*b* for retrieving map data and/or related map attributes. In one embodiment, the geographic databases 109*a* or 109*b* can include electronic or digital representations of mapped geographic features. In one embodiment, the navigation application 107 and/or map feedback assistant 117 have connectivity over a communication network 147 to the components of the cloud 105 (e.g., feedback API 123, feedback campaign manager 133, etc.). In one embodiment, the system 100 also includes or otherwise has access to one or more services (not shown) that use LLM-based map feedback/error reporting and/or data derived therefrom (e.g., map updates). These services or applications include, but are not limited to, autonomous/semi-autonomous vehicle operation, mapping services, navigation services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services 133 use the output of the system 100.

In one embodiment, the system 100 may be or include a platform with multiple interconnected components. The platform may include multiple servers, intelligent networking devices, computing devices, components, and corresponding software for LLM-based map feedback/error reporting.

In one embodiment, the mobile device 101 and/or other clients 103 may execute a software application 107 for map feedback reporting according to the embodiments described herein. By way of example, the application 121 may also be any type of application that is executable on the mobile device 101 and/or other client 103, such as autonomous driving applications (in the case of vehicles), mapping applications, location-based service applications, navigation applications, content provisioning services, camera/imaging application, media player applications, social networking applications, calendar applications, and the like. In one embodiment, the application 107 may act as a client for the components of the cloud 105 and perform one or more functions associated with map feedback reporting alone or in combination with the cloud components.

By way of example, the client 103 and/or mobile device 101 is any type of embedded system, mobile terminal, or portable terminal including a built-in navigation system, a personal navigation device, mobile handset, station, unit, device, multimedia computer, multimedia tablet, Internet node, communicator, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the client 103 can support any type of interface to the user (such as "wearable" circuitry, etc.). In one embodiment, the client 103 may be associated with a vehicle or be a component part of a vehicle.

In one optional embodiment, the client 103 and/or mobile device 101 are configured with various sensors for generating or collecting sensor observations (e.g., for processing by the system 100), related geographic data, etc. In one embodiment, the sensed data represents sensor data associated with a geographic location or coordinates at which the sensor data was collected to detect or validate map feedback reports. In this way, the sensor data can act as observation data that can be processed to provide contextual information for map feedback reporting according to the various embodiments described herein. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road boundaries, road sign information, images of road obstructions, etc. for analysis), LiDAR, Inertial Measurement Units (IMUs) for e.g. performing dead-reckoning, radar, an audio recorder for gathering audio data, velocity sensors mounted on steering wheels of the vehicles, switch sensors for determining whether one or more vehicle switches are engaged, and the like.

Other examples of optional sensors of the client 103 and/or mobile device 101 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the client 103 and/or mobile device 101, in the case of a vehicle, may detect the relative distance of the vehicle to a road boundary, the presence of other vehicles, pedestrians, traffic lights, potholes and any other objects, or a combination thereof. In one scenario, the sensors may detect weather data, traffic information, or a combination thereof. In one embodiment, the client 103 and/or mobile device 101 may include GPS or other satellite-based receivers to obtain geographic coordinates or signal for determine the coordinates from satellites. Further, the location can be determined by visual odometry, triangulation systems such as A-GPS, Cell of Origin, or other location extrapolation technologies. In yet another embodiment, the sensors can determine the status of various control elements of the vehicle, such as activation of wipers, use of a brake pedal, use of an acceleration pedal, angle of the steering wheel, activation of hazard lights, activation of head lights, etc.

In another optional embodiment, the communication network 147 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), 5G New Radio networks, Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the components of the system 100 communicate with each other and other components using well known, new or still developing protocols. In this context, a protocol includes a set of rules defining how the network nodes within the communication network 147 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically affected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a datalink (layer 2) header, an internetwork (layer 3) header and a transport (layer 4) header, and various application (layer 5, layer 6 and layer 7) headers as defined by the OSI Reference Model.

Figure 8:
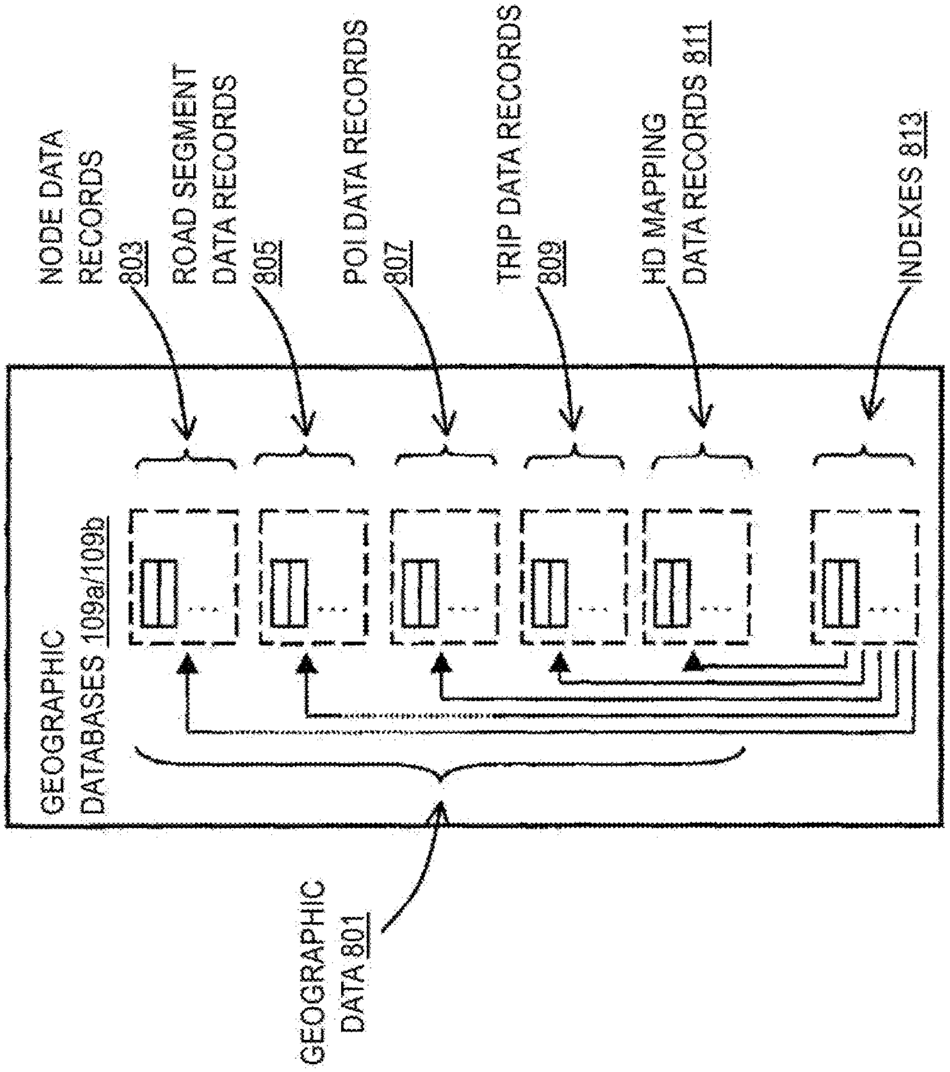
FIG. 8 is a diagram of a geographic database, according to one example embodiment.

FIG. 8 is a diagram of the geographic databases 109*a* or 109*b*, according to one embodiment. In one embodiment, the geographic databases 109*a* or 109*b* includes geographic data 801 used for (or configured to be compiled to be used for) mapping and/or navigation-related services. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic databases 109*a* or 109*b*.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic databases 109*a* or 109*b* follows certain conventions. For example, links do not cross themselves and do not cross each other except at a node. Also, there are no duplicated shape points, nodes, or links. Two links that connect each other have a common node. In the geographic databases 109*a* or 109*b*, overlapping geographic features are represented by overlapping polygons. When polygons overlap, the boundary of one polygon crosses the boundary of the other polygon. In the geographic databases 109*a* or 109*b*, the location at which the boundary of one polygon intersects the boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic databases 109*a* or 109*b* includes node data records 803, road segment or link data records 805, POI data records 807, map feedback data records 809, other records 811, and indexes 813, for example. More, fewer, or different data records can be provided. In one embodiment, additional data records (not shown) can include cartographic ("carto") data records, routing data, and maneuver data. In one embodiment, the indexes 813 may improve the speed of data retrieval operations in the geographic databases 109*a* or 109*b*. In one embodiment, the indexes 813 may be used to quickly locate data without having to search every row in the geographic databases 109*a* or 109*b* every time it is accessed. For example, in one embodiment, the indexes 813 can be a spatial index of the polygon points associated with stored feature polygons.

In exemplary embodiments, the road segment data records 805 are links or segments representing roads, streets, or paths, as can be used in the calculated route or recorded route information for determination of one or more personalized routes. The node data records 803 are end points (such as intersections) corresponding to the respective links or segments of the road segment data records 805. The road link data records 805 and the node data records 803 represent a road network, such as used by vehicles, cars, and/or other entities. Alternatively, the geographic databases 109*a* or 109*b* can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic databases 109*a* or 109*b* can include data about the POIs and their respective locations in the POI data records 807. The geographic databases 109*a* or 109*b* can also include data about places, such as cities, towns, or other communities, and other geographic features, such as bodies of water, mountain ranges, etc. Such place or feature data can be part of the POI data records 807 or can be associated with POIs or POI data records 807 (such as a data point used for displaying or representing a position of a city).

In one embodiment, the geographic databases 109*a* or 109*b* can also include map feedback data records 809 for map feedback reports, contextual parameters, vehicle attributes, driver attributes, and/or any other related information/data used and/or generated according to the various embodiments described herein. In one embodiment, the map feedback data records 809 can be associated with one or more of the node records 803, road segment records 805, and/or POI data records 807 to associate the map feedback reports with specific geographic locations. In this way, the map feedback data can also be associated with the characteristics or metadata of the corresponding record 803, 805, and/or 807.

In one embodiment, the geographic databases 109*a* or 109*b* can be maintained by content providers (e.g., a map developer or service provider). The map developer or service provider can collect geographic data to generate and enhance the geographic databases 109*a* or 109*b*. There can be different ways used by the map developer to collect data. These ways can include obtaining data from other sources, such as municipalities or respective geographic authorities. In addition, the map developer can employ field personnel to travel by vehicle (e.g., mobile device 101 and/or client 103) along roads throughout the geographic region to observe features and/or record information about them, for example. Also, remote sensing, such as aerial or satellite photography, can be used.

The geographic databases 109*a* or 109*b* can be a master geographic database stored in a format that facilitates updating, maintenance, and development. For example, the master geographic database or data in the master geographic database can be in an Oracle spatial format or other spatial format, such as for development or production purposes. Map layers may be utilized. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a mobile device 101 or client 103, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing LLM map feedback reporting may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Additionally, as used herein, the term 'circuitry' may refer to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular device, other network device, and/or other computing device.

Figure 9:
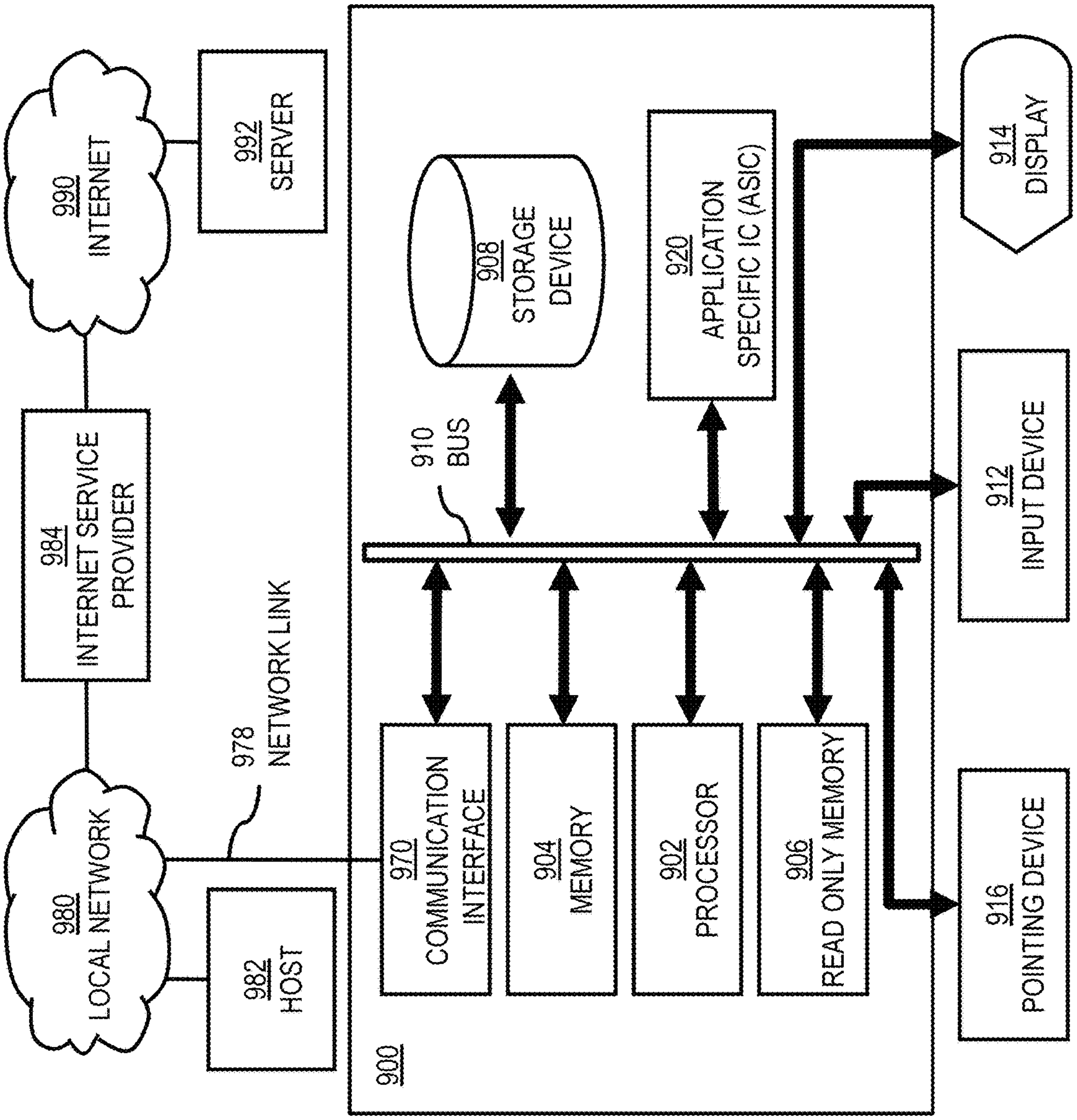
FIG. 9 is a diagram of hardware that can be used to implement an example embodiment.

FIG. 9 illustrates a computer system 900 upon which an embodiment of the invention may be implemented. Computer system 900 is programmed (e.g., via computer program code or instructions) to provide LLM map feedback reporting as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 910 includes one or more parallel conductors of information so that information is transferred quickly among devices coupled to the bus 910. One or more processors 902 for processing information are coupled with the bus 910.

A processor 902 performs a set of operations on information as specified by computer program code related to providing LLM map feedback reporting. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for providing LLM map feedback reporting. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for providing LLM map feedback reporting, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 147 for providing LLM map feedback reporting.

The term computer-readable medium is used herein to refer to any medium that participates in providing information to processor 902, including instructions for execution. Such a medium may take many forms, including, but not limited to, non-volatile media, volatile media and transmission media. Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system can be deployed in various configurations within other computer systems, e.g., host 982 and server 992.

FIG. 10 illustrates a chip set 1000 upon which an embodiment of the invention may be implemented. Chip set 1000 is programmed to provide LLM map feedback reporting as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to perform specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to provide LLM map feedback reporting. The memory 1005 also stores the data associated with or generated by the execution of the inventive steps.

Figure 11:
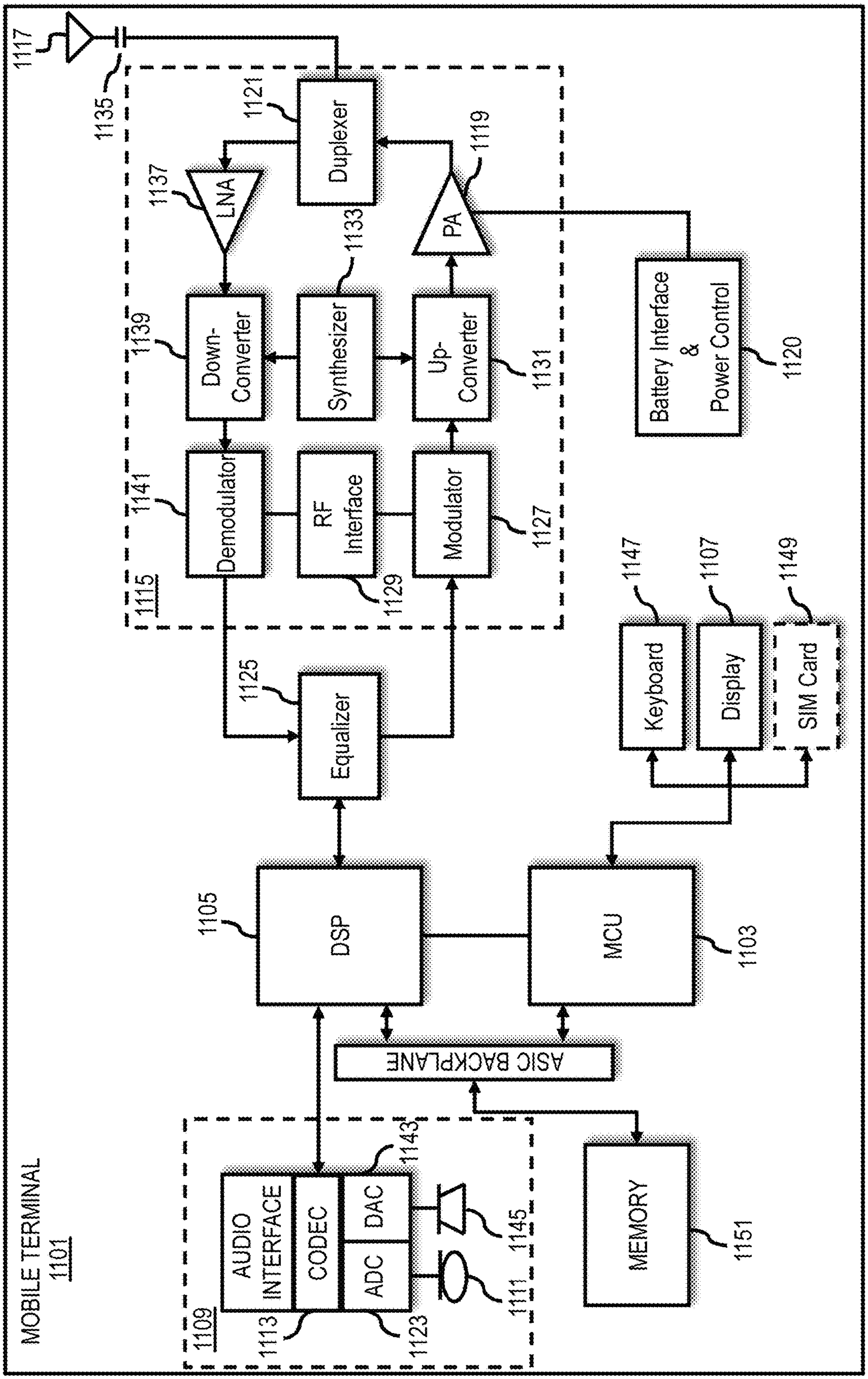
FIG. 11 is a diagram of a mobile terminal (e.g., client terminal, vehicle, or part thereof) that can be used to implement an example embodiment.

FIG. 11 is a diagram of exemplary components of a mobile terminal 1101 (e.g., client 103, mobile device 101, or component thereof) capable of operating in the system of FIG. 1, according to one embodiment. Generally, a radio receiver is often defined in terms of front-end and back-end characteristics. The front end of the receiver encompasses all of the Radio Frequency (RF) circuitry whereas the back end encompasses all of the base-band processing circuitry. Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile station functions that offer automatic contact matching. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile station 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, 5G New Radio networks, code division multiple access (CDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a landline connected to a Public Switched Telephone Network (PSTN), or other telephony networks.

Voice signals transmitted to the mobile station 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile station 1101 to provide LLM map feedback reporting. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the station. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile station 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1151 may be, but not limited to, a single memory, CD, DVD, ROM, RAM, EEPROM, optical storage, or any other non-volatile or non-transitory storage medium capable of storing digital data.

An optionally incorporated SIM card 1149 carries, for instance, important information, such as the cellular phone number, the carrier supplying service, subscription details, and security information. The SIM card 1149 serves primarily to identify the mobile station 1101 on a radio network. The card 1149 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:

receiving an input from a user, the input specifying a map error;

processing the input using a large language model (LLM) to classify a map error type of the map error;

determining a map error template based on the map error type, wherein the map error template specifies, at least in part, one or more data fields for reporting the map error using a structured data format for the map error type;

using the map error template to construct one or more prompts for the LLM to generate one or more questions to collect one or more data items for populating the one or more data fields from a user;

providing the one or more prompts to the LLM to cause the LLM to initiate a collection of the one or more data items from the user using the one or more questions;

using the map error template to construct one or more additional prompts for the LLM to generate a map error report comprising the one or more data items in the structured data format, wherein the structured data format uses at least one schema to define one or more locations, one or more details, one or more error flags, or a combination thereof associated with the map error;

providing the one or more additional prompts to the LLM to cause the LLM to initiate a generation of the map error report; and transmitting the map error report to a map feedback system.

2. The method of claim 1, wherein the collection of the one or more data items further comprises:

using the LLM to iteratively process the one or more data collected from the user to determine a completeness of the populating of the one or more data fields; and causing the LLM to generate one or more additional questions to collect the one or more data items from the user until the LLM determines that the populating of the one or more data fields is complete.

3. The method of claim 2, wherein the one or more data fields include one or more required data fields, one or more optional data fields, or a combination thereof; and wherein the completeness of the populating of the one or more data fields is based on the one or more required data fields, the one or more optional data fields, or a combination thereof.

4. The method of claim 1, further comprising:

determining contextual information about the map error from one or more sensors of a vehicle, a device, or a combination thereof associated with the user providing the input;

wherein the one or more prompts, the one or more additional prompts, the one or more data items, the map error report, or a combination thereof are based on the contextual information.

5. The method of claim 4, wherein the contextual information includes an estimated field of view of the user when making the map error report, and wherein the estimated field of view of the user is computed from sensor data of the one or more sensors.

6. The method of claim 4, wherein the contextual information includes a time of the map error, a location of the map error, a current speed, a current heading, a current navigation route, a previous location, a previous speed, a previous heading, a previous navigation route, or a combination thereof.

7. The method of claim 1, wherein the contextual information includes image data captured by the one or more sensors.

8. The method of claim 1, wherein the collection of the one or more data items comprises prompting the LLM to generate one or more clarifying questions to the user based on a computed accuracy of the one or more data items.

9. The method of claim 1, further comprising:

generating a visual representation of the map error, a map correction based on a map error, or a combination thereof; and providing the visual representation in a user interface of a device.

10. The method of claim 1, wherein the one or more additional prompts for the LLM to generate a map error report are constructed by invoking a map error type-specific input function to process the input from the user into the structured data format.

11. The method of claim 1, wherein the collection of the one or more data items occurs over a plurality of data collection sessions; and wherein the one or more data items, the one or more questions, the map error report, or a combination thereof is stored for access across the plurality of data collection sessions.

12. The method of claim 1, further comprising:

iteratively modifying the one or more prompts, the one or more additional prompts, or a combination thereof to reduce a number of the one or more questions used during the collection of the one or more data items.

13. The method of claim 1, wherein the collection of the one or more data items includes generating one or more additional questions by the LLM to disambiguate the one or more data items collected from the user.

14. The method of claim 1, further comprising:

validating the one or more data items collected from the user by comparing the one or more data items to one or more known ranges, one or more known values, or a combination thereof.

15. An apparatus comprising:

at least one processor; and at least one memory including computer program code for one or more programs, the at least one memory and the computer program code configured to, with the at least one processor, cause the apparatus to perform at least the following, receive an input from a user, the input specifying a map error;

process the input using a large language model (LLM) to classify a map error type of the map error;

determine a map error template based on the map error type, wherein the map error template specifies, at least in part, one or more data fields for reporting the map error using a structured data format for the map error type;

use the map error template to construct one or more prompts for the LLM to generate one or more questions to collect one or more data items for populating the one or more data fields from a user;

provide the one or more prompts to the LLM to cause the LLM to initiate a collection of the one or more data items from the user using the one or more questions;

use the map error template to construct one or more additional prompts for the LLM to generate a map error report comprising the one or more data items in the structured data format, wherein the structured data format uses at least one schema to define one or more locations, one or more details, one or more error flags, or a combination thereof associated with the map error;

provide the one or more additional prompts to the LLM to cause the LLM to initiate a generation of the map error report; and transmit the map error report to a map feedback system.

16. The apparatus of claim 15, wherein the collection of the one or more data items further causes the apparatus to:

use the LLM to iteratively process the one or more data collected from the user to determine a completeness of the populating of the one or more data fields; and cause the LLM to generate one or more additional questions to collect the one or more data items from the user until the LLM determines that the populating of the one or more data fields is complete.

17. The apparatus of claim 16, wherein the one or more data fields include one or more required data fields, one or more optional data fields, or a combination thereof, and wherein the completeness of the populating of the one or more data fields is based on the one or more required data fields, the one or more optional data fields, or a combination thereof.

18. A non-transitory computer-readable storage medium carrying one or more sequences of one or more instructions which, when executed by one or more processors, cause an apparatus to perform:

receiving an input from a user, the input specifying a map error;

processing the input using a large language model (LLM) to classify a map error type of the map error;

determining a map error template based on the map error type, wherein the map error template specifies, at least in part, one or more data fields for reporting the map error using a structured data format for the map error type;

using the map error template to construct one or more prompts for the LLM to generate one or more questions to collect one or more data items for populating the one or more data fields from a user;

providing the one or more prompts to the LLM to cause the LLM to initiate a collection of the one or more data items from the user using the one or more questions;

using the map error template to construct one or more additional prompts for the LLM to generate a map error report comprising the one or more data items in the structured data format, wherein the structured data format uses at least one schema to define one or more locations, one or more details, one or more error flags, or a combination thereof associated with the map error;

providing the one or more additional prompts to the LLM to cause the LLM to initiate a generation of the map error report; and transmitting the map error report to a map feedback system.

19. The non-transitory computer-readable storage medium of claim 18, wherein the collection of the one or more data items causes the apparatus to further perform:

using the LLM to iteratively process the one or more data collected from the user to determine a completeness of the populating of the one or more data fields; and causing the LLM to generate one or more additional questions to collect the one or more data items from the user until the LLM determines that the populating of the one or more data fields is complete.

20. The non-transitory computer-readable storage medium of claim 19, wherein the one or more data fields include one or more required data fields, one or more optional data fields, or a combination thereof; and wherein the completeness of the populating of the one or more data fields is based on the one or more required data fields, the one or more optional data fields, or a combination thereof.

* * * * *